(12) United States Patent
Maynard et al.

(10) Patent No.: US 6,654,125 B2
(45) Date of Patent: Nov. 25, 2003

(54) METHOD AND APPARATUS FOR OPTICAL SPECTROSCOPY INCORPORATING A VERTICAL CAVITY SURFACE EMITTING LASER (VCSEL) AS AN INTERFEROMETER REFERENCE

(75) Inventors: John D. Maynard, Albuquerque, NM (US); Trent Ridder, Sandia Park, NM (US)

(73) Assignee: Inlight Solutions, Inc, Albuquerque, NM (US)

( * ) Notice: Subject to any disclaimer, the term of this patent is extended or adjusted under 35 U.S.C. 154(b) by 0 days.

(21) Appl. No.: 10/116,267

(22) Filed: Apr. 4, 2002

(65) Prior Publication Data

US 2003/0189709 A1 Oct. 9, 2003

(51) Int. Cl.[7] ................................................ G01B 9/02
(52) U.S. Cl. ..................................................... 356/451
(58) Field of Search ..................... 356/451; 250/339.07, 250/339.08, 339.09

(56) References Cited

U.S. PATENT DOCUMENTS

| | | | |
|---|---|---|---|
| 4,094,609 A | 6/1978 | Fujii et al. | |
| 4,653,880 A | 3/1987 | Sting et al. | |
| 4,655,225 A | 4/1987 | Dahne et al. | |
| 4,661,706 A | 4/1987 | Messerschmidt et al. | |
| 4,684,255 A | 8/1987 | Ford | |
| 4,712,912 A | 12/1987 | Messerschmidt | |
| 4,730,882 A | 3/1988 | Messerschmidt | |
| 4,853,542 A | 8/1989 | Milosevic et al. | |
| 4,857,735 A | 8/1989 | Noller | |
| 4,859,064 A | 8/1989 | Messerschmidt et al. | |
| 4,867,557 A | 9/1989 | Takatani et al. | |
| 4,882,492 A | 11/1989 | Schlager | |
| 4,883,953 A | 11/1989 | Koashi et al. | |
| 4,975,581 A | 12/1990 | Robinson et al. | |
| 5,007,423 A | 4/1991 | Branstetter et al. | |
| 5,015,100 A | 5/1991 | Doyle | |

(List continued on next page.)

FOREIGN PATENT DOCUMENTS

| | | |
|---|---|---|
| EP | 0 426 358 A1 | 5/1991 |
| EP | 0 573 137 A2 | 12/1993 |

(List continued on next page.)

OTHER PUBLICATIONS

Anderson, Chad E. et al., "Fundamentals of Calibration Transfer Through Procrustes Analysis," *Applied Spectros.*, vol. 53, No. 10 (1999) pp. 1268–1276.

Atherton, P.D. et al., "Tunable Fabry–Perot Filters," *Optical Engineering*, vol. 20, No. 6, Nov./Dec. 1981, pp. 806–814.

Beebe, Kenneth R. et al., "Chapter 3: Preprocessing," *Chemometrics: A Practical Guide*, ©John Wiley & Sons, Inc., date unknown, pp. 26–55.

(List continued on next page.)

*Primary Examiner*—Samuel A. Turner
*Assistant Examiner*—Patrick Connolly
(74) *Attorney, Agent, or Firm*—Crompton, Seager & Tufte, LLC; David Crompton

(57) ABSTRACT

A vertical cavity surface-emitting laser (VCSEL) package utilized as a laser reference for use in interferometry. The primary disadvantage of VCSELs, in terms of interferometry, has been found to be the relatively poor wavenumber stability of the beam. The present invention is a method and apparatus that makes viable a VCSEL package suitable for use as a reference in interferometry. The VCSEL package incorporates current control, temperature control and an algorithm for correcting wavenumber drift. The algorithm is derived from spectroscopic analysis of a reference sample having a known spectrum and comparing the generated spectrum to the known spectrum.

32 Claims, 23 Drawing Sheets

U.S. PATENT DOCUMENTS

| | | |
|---|---|---|
| 5,028,787 A | 7/1991 | Rosenthal et al. |
| 5,068,536 A | 11/1991 | Rosenthal |
| 5,070,874 A | 12/1991 | Barnes et al. |
| 5,109,465 A | 4/1992 | Klopotek |
| 5,158,082 A | 10/1992 | Jones |
| 5,178,142 A | 1/1993 | Harjunmaa et al. |
| 5,188,108 A | 2/1993 | Secker |
| 5,204,532 A | 4/1993 | Rosenthal |
| 5,222,496 A | 6/1993 | Clarke et al. |
| 5,223,715 A | 6/1993 | Taylor |
| 5,224,478 A | 7/1993 | Sakai et al. |
| 5,225,678 A | 7/1993 | Messerschmidt |
| 5,237,178 A | 8/1993 | Rosenthal et al. |
| 5,243,546 A | 9/1993 | Maggard |
| 5,257,086 A | 10/1993 | Fateley et al. |
| 5,267,152 A | 11/1993 | Yang et al. |
| 5,268,749 A | 12/1993 | Weber et al. |
| 5,303,026 A | 4/1994 | Strobl et al. |
| 5,311,021 A | 5/1994 | Messerschmidt |
| 5,348,003 A | 9/1994 | Caro |
| 5,355,880 A | 10/1994 | Thomas et al. |
| 5,360,004 A | 11/1994 | Purdy et al. |
| 5,361,758 A | 11/1994 | Hall et al. |
| 5,379,764 A | 1/1995 | Barnes et al. |
| 5,402,778 A | 4/1995 | Chance |
| 5,419,321 A | 5/1995 | Evans |
| 5,435,309 A | 7/1995 | Thomas et al. |
| 5,459,317 A | 10/1995 | Small et al. |
| 5,459,677 A | 10/1995 | Kowalski et al. |
| 5,460,177 A | 10/1995 | Purdy et al. |
| 5,490,506 A | 2/1996 | Takatani et al. |
| 5,494,032 A | 2/1996 | Robinson et al. |
| 5,515,847 A | 5/1996 | Braig et al. |
| 5,533,509 A | 7/1996 | Koashi et al. |
| 5,592,402 A | 1/1997 | Beebe et al. |
| 5,596,992 A | 1/1997 | Haaland et al. |
| 5,606,164 A | 2/1997 | Price et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,875 A | 9/1997 | Block et al. |
| 5,677,762 A | 10/1997 | Ortyn et al. |
| 5,708,593 A | 1/1998 | Saby et al. |
| 5,743,262 A | 4/1998 | Lepper, Jr. et al. |
| 5,747,806 A | 5/1998 | Khalil et al. |
| 5,750,994 A | 5/1998 | Schlager |
| 5,782,755 A | 7/1998 | Chance et al. |
| 5,792,050 A | 8/1998 | Alam et al. |
| 5,808,739 A | 9/1998 | Turner et al. |
| 5,817,007 A | 10/1998 | Fodgaard et al. |
| 5,818,048 A | 10/1998 | Sodickson et al. |
| 5,823,951 A | 10/1998 | Messerschmidt |
| 5,828,066 A | 10/1998 | Messerschmidt |
| 5,830,132 A | 11/1998 | Robinson |
| 5,853,370 A | 12/1998 | Chance et al. |
| 5,857,462 A | 1/1999 | Thomas et al. |
| 5,892,786 A * | 4/1999 | Lott ............................ 372/50 |
| 5,923,422 A * | 7/1999 | Keens et al. ................. 356/451 |
| 5,933,792 A | 8/1999 | Andersen et al. |
| 5,935,062 A | 8/1999 | Messerschmidt et al. |
| 5,945,676 A | 8/1999 | Khalil et al. |
| 5,957,841 A | 9/1999 | Maruo et al. |
| 6,016,435 A | 1/2000 | Maruo et al. |
| 6,025,597 A | 2/2000 | Sterling et al. |
| 6,026,314 A | 2/2000 | Amerov et al. |
| 6,034,370 A | 3/2000 | Messerschmidt |
| 6,040,578 A | 3/2000 | Malin et al. |
| 6,041,247 A | 3/2000 | Weckstrom et al. |
| 6,043,492 A | 3/2000 | Lee et al. |
| 6,045,502 A | 4/2000 | Eppstein et al. |
| 6,046,808 A | 4/2000 | Fateley |
| 6,056,738 A | 5/2000 | Marchitto et al. |
| 6,061,581 A | 5/2000 | Alam et al. |
| 6,061,582 A | 5/2000 | Small et al. |
| 6,066,847 A | 5/2000 | Rosenthal |
| 6,069,905 A | 5/2000 | Davis et al. |
| 6,073,037 A | 6/2000 | Alam et al. |
| 6,088,605 A | 7/2000 | Griffith et al. |
| 6,115,673 A | 9/2000 | Malin et al. |
| 6,152,876 A | 11/2000 | Robinson et al. |
| 6,157,041 A | 12/2000 | Thomas et al. |
| 6,172,743 B1 | 1/2001 | Kley et al. |
| 6,192,261 B1 | 2/2001 | Gratton et al. |
| 6,212,424 B1 | 4/2001 | Robinson |
| 6,226,541 B1 | 5/2001 | Eppstein et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,241,663 B1 | 6/2001 | Wu et al. |
| 6,272,367 B1 | 8/2001 | Chance |
| 6,280,381 B1 | 8/2001 | Malin et al. |
| 6,309,884 B1 | 10/2001 | Cooper et al. |
| 6,441,388 B1 | 8/2002 | Thomas et al. |
| 6,504,614 B1 | 1/2003 | Messerschmidt et al. |
| 2002/0171834 A1 | 11/2002 | Rowe et al. |
| 2003/0007147 A1 | 1/2003 | Johnson |
| 2003/0023152 A1 | 1/2003 | Abbink et al. |
| 2003/0023170 A1 | 1/2003 | Gardner et al. |

FOREIGN PATENT DOCUMENTS

| | | |
|---|---|---|
| EP | 0 631 137 A2 | 12/1994 |
| EP | 0 670 143 A1 | 9/1995 |
| EP | 0 681 166 A1 | 11/1995 |
| EP | 0 836 083 A1 | 4/1998 |
| EP | 0 898 934 A1 | 3/1999 |
| JP | 2000-131143 | 5/2000 |
| JP | 2001-21489 | 1/2001 |
| WO | WO 86/00406 A1 | 1/1986 |
| WO | WO 92/00513 A1 | 1/1992 |
| WO | WO 92/17765 A1 | 10/1992 |
| WO | WO 93/07801 A1 | 4/1993 |
| WO | WO 97/23159 A1 | 7/1997 |
| WO | WO 97/27800 A1 | 8/1997 |
| WO | WO 98/37805 A1 | 9/1998 |
| WO | WO 98/40723 A1 | 9/1998 |
| WO | 0 897 691 A2 | 2/1999 |
| WO | WO 99/56616 A1 | 11/1999 |
| WO | WO 00/24454 A1 | 5/2000 |
| WO | WO 00/49690 A1 | 8/2000 |
| WO | WO 00/65988 A1 | 11/2000 |
| WO | WO 01/20371 A2 | 3/2001 |
| WO | WO 01/28417 A1 | 4/2001 |
| WO | WO 01/58344 A1 | 8/2001 |
| WO | WO 02/065090 A2 | 8/2002 |
| WO | WO 02/082989 A1 | 10/2002 |

OTHER PUBLICATIONS

Brault, James W., "New Approach to High–Precision Fourier Transform Spectrometer Design," *Applied Optics*, vol. 35, No. 16, Jun. 1, 1996, pp. 2891–2896.

Breiman, Leo, "Bragging Predictors," *Machine Learning*, vol. 24 (1996) pp. 123–140.

Cassarly, W.J. et al., "Distributed Lighting Systems: Uniform Light Delivery," *Source Unknown*, pp. 1698–1702.

Crosdale et al., "Wavelength Control of a Diode Laser for Distance Measuring Interferometry," *SPIE*, vol. 1219 (1990) pp. 490–501.

de Noord, Onno E., "Multivariate Calibration Standardization," *Chemometrics and Intelligent Laboratory Systems* vol. 25, (1994) pp. 85–97.

Faber, Nicolaas, "Multivariate Sensitivity for the Interpretation of the Effect of Spectral Pretreatment Methods on Near–Infrared Calibration Model Predictions," *Analytical Chemistry*, vol. 71, No. 3, Feb. 1, 1999, pp. 557–565.

Francon, M., "Chapter VI, Multiple Beam Interferences," *Optical Interferometry*, Academic Press, New York (1966).

Gabriely, Ilan MD et al., "Transcutaneous Glucose Measurement Using Near–Infrared Spectroscopy During Hypoglycemia," *Diabetes Care*, vol. 22, No. 12, Dec. 1999, pp. 2026–2032.

Geladi, Paul et al., A Multivariate NIR Study of Skin Alterations in Diabetic Patients as Compared to Control Subjects, *'J. Nera Infrared Spectrosc.*, vol. 8 (2000) pp. 217–227.

Haaland, David M., "Multivariate Calibration Methods Applied to the Quantitative Analysis of Infrared Spectra," *Computer–Enhanced Analytical Spectroscopy*, vol. 3 (1992), pp. 1–29.

Haaland, David M. et al. "Reagentless Near–Infrared Determination of Glucose in Whole Blood Using Multivariate Calibration," *Applied Spectroscopy*, vol. 46, No. 10 (1992) pp. 1575–1578.

Heinemann, Lutz et al., "Continuous Glucose Monitoring: An Overview of Today's Technologies and Their Clinical Applications," *IJCP Supplement 129*, Jul. 2002, pp. 75–79.

Heise H. Michael et al., "Near–Infrared Reflectance Spectroscopy for Noninvasive Monitoring of Metabolites," *Clin. Chem. Lab. Med.*, vol. 38 No. 2 (2000) pp. 137–145.

Heise, H.M. et al., "Near Infrared Spectrometric Investigation of Pulsatile Blood Flow for Non–Invasive Metabolite Monitoring," *CP430, Fourier Transform Spectroscopy: 11th International Conference*, (1998) pp. 282–285.

Heise, H.M. et al., "Noninvasive Blood Glucose Sensors Based on Near–Infrared Spectroscopy," *Artif Organs*, vol. 18, No. 6 (1994) pp. 1–9.

Heise, H.M. "Non–Invasive Monitoring of Metabolites Using Near Infrared Spectroscopy: State of the Art," *Horm. Metab. Res.*, vol. 28 (1996) pp. 527–534.

Hopkins, George W. et al., "In–vivo NIR Diffuse–reflectance Tissue Spectroscopy of Human Subjects," *SPIE*, vol. 3597, Jan. 1999, pp. 632–641.

Jagemann, Kay–Uwe et al. "Application of Near–Infrared Spectroscopy for Non–Invasive Determination of Blood/Tissue Glucose Using Neural Networks," *Zeitschrift für Physikalische Chemie*, Bd.191, S. 179–190 (1995).

Khalil, Omar S., "Spectroscopic and Clinical Aspects of Noninvasive Glucose Measurements," *Clinical Chemistry*, 45:2 (1999) pp. 165–177.

Kohl, Matthias et al., "The Influence of Glucose Concentration Upon the Transport of Light in Tissue–simulating Phantoms," *Phys. Med. Biol.*, vol. 40 (1995) pp. 1267–1287.

Kumar, G. et al., "Optimal Probe Geometry for Near–Infrared Spectroscopy of Biological Tissue," *Applied Optics*, vol. 36, No. 10, Apr. 1, 1997, pp. 2286–2293.

Kuwa, Katsuhiko et al., "Relationships of Glucose Concentrations in Capillary Whole Blood, Venous Whole Blood and Venous Plasma," *Clinica Chimica Acta*, 307 (3001) pp. 187–192.

Lorber, Avraham et al., "Local Centering in Multivariate Calibration," *Journal of Chemometrics*, vol. 10 (1996) pp. 215–220.

Lorber, Avraham et al., "Net Analyte Signal Calculation in Multivariate Calibration," *Analytical Chemistry*, vol. 69, No. 8, Apr. 15, 1997, pp. 1620–1626.

Malin, Stephen F., "Non–Invasive Measurement of Glucose by Near Infrared Diffuse Reflectance Spectroscopy," *31st Annual Oak Ridge Conference*, Sigma Diagnostics, Inc., Apr. 23, 1999, 1 sheet.

Marbach, Ralf, "Measurement Techniques for IR Spectroscopic Blood Glucose Determination," Mar. 28, 1994, pp. 1–158.

Marbach, R. et al. "Noninvasive Blood Glucose Assay by Near–Infrared Diffuse Reflectance Spectroscopy of the Human Inner Lip," *Applied Spectroscopy*, vol. 47, No. 7 (1993) pp. 875–881.

Marbach, R. et al. "Optical Diffuse Reflectance Accessory for Measurements of Skin Tissue by Near–Infrared Spectroscopy," *Applied Optics*, vol. 34, No. 4, Feb. 1, 1995, pp. 610–621.

McGarraugh, Geoff et al., "Glucose Measurements Using Blood Extracted from the Forearm and the Finger," ©TheraSense, Inc. (2001) pp. 1–7.

McGuire E.A.H. et al., "Effects of Arterial Versus Venous Sampling on Analysis of Glucose Kinetics in Man," *Journal of Applied Physiology*, vol. 41, No. 4, Oct. 1976, pp. 565–572.

Robinson, M. Ries et al., "Noninvasive Glucose Monitoring in Diabetic Patients: A Preliminary Evaluation," *Clinical Chemistry*, vol. 38, No. 9 (1992) pp. 1618–1622.

Royston, David D. et al., "Optical Properties of Scattering and Absorbing Materials Used in the Development of Optical Phantoms at 1064 NM," *Journal of Biomedical Optics*, vol. 1, No. 1, Jan. 1996, pp. 110–116.

Service, F. John et al., "Dermal Interstitial Glucose as an Indicator of Ambient Glycemia", *Diabetes Care*, vol. 20, No. 9, Sep. 1997, 9 pages.

Teijido, J.M. et al., "Design of a Non–conventional Illumination System Using a Scattering Light Pipe," *SPIE*, vol. 2774 (1996) pp. 747–756.

Teijido, J.M. et al., "Illumination Light Pipe Using Micro–Optics as Diffuser," *SPIE*, vol. 2951 (1996) pp. 146–155.

Thomas, Edward V. et al., "Development of Robust Multivariate Calibration Models," *Technometrics*, vol. 42, No. 2, May 2000, pp. 168–177.

Ward, Kenneth J. et al., "Post–Prandial Blood Glucose Determination by Quantitative Mid–Infrared Spectroscopy," *Applied Spectroscopy*, vol. 46, No. 6 (1992) pp. 959–965.

Whitehead, L.A. et al., "High–efficiency Prism Light Guides with Confocal Parabolic Cross Sections," *Applied Optics*, vol. 37, No. 22, Aug. 1, 1998, pp. 5227–5233.

* cited by examiner

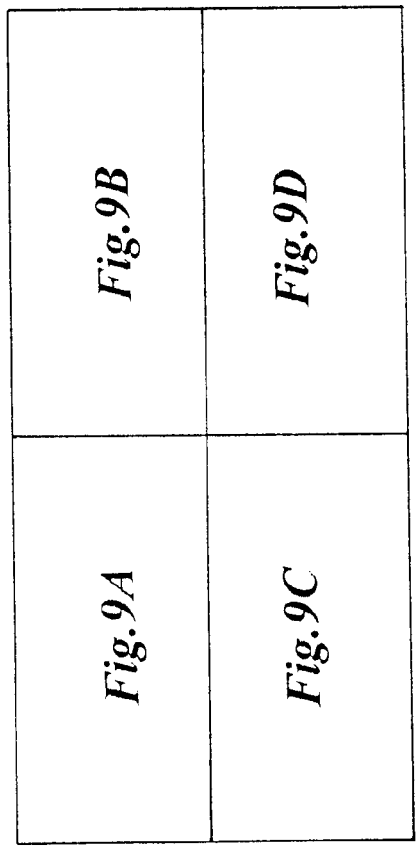

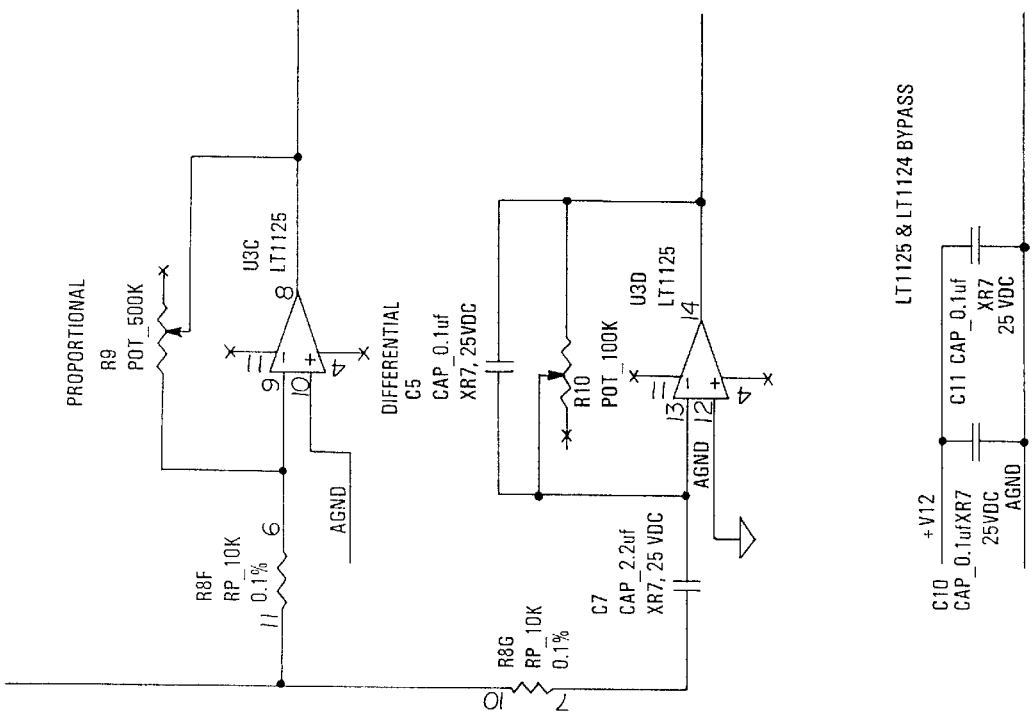
Fig. 9C
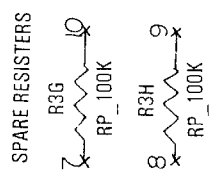

METHOD AND APPARATUS FOR OPTICAL SPECTROSCOPY INCORPORATING A VERTICAL CAVITY SURFACE EMITTING LASER (VCSEL) AS AN INTERFEROMETER REFERENCE

RELATED APPLICATIONS

This application is related to U.S. patent application Ser. No. 09/832,585, entitled "System for Non-Invasive Measurement of Glucose in Humans"; U.S. patent application Ser. No. 09/832,586, entitled "Illumination Device and Method for Spectroscopic Analysis"; U.S. patent application Ser. No. 09/832,631, entitled "Encoded Variable Filter Spectrometer"; and U.S. patent application Ser. No. 09/832,608, entitled "Optically Similar References Samples and Related Methods for Multivariate Calibration Models Used in Optical Spectroscopy", all filed on Apr. 11, 2001, and assigned to the assignee of the present application. The disclosure of each of these related applications is hereby incorporated by reference.

TECHNICAL FIELD

The present invention generally relates to the field of diagnostic spectroscopy, and more specifically, to a method and apparatus for providing a laser reference for Fourier transform spectrometers. More specifically, the present invention is a subsystem including a vertical cavity surface emitting laser (VCSEL) and selected components making the subsystem useable as a reference laser.

BACKGROUND OF THE INVENTION

In interferometry such as that used for optical spectroscopy, reference lasers are used to provide the ability to obtain digitized interferogram points that are equivalently spaced in position, which is a requirement of Fourier transform algorithms. The industry standard reference is the helium neon laser because of its inherent lasing wavenumber stability and its relatively small size and low cost when compared to other gas lasers.

International Publication WO 00/49690 to Singh et al. and entitled "Compact Wavelength-Independent Wavelength-Locker for Absolute Wavelength Stability of a Laser Diode" discusses the wavelength stabilization of a laser diode by tapping a fraction of the laser diode's output and passing it through a narrow band power splitter to two detectors. The signal from the two detectors is compared, and predetermined control signals are used to maintain a constant lasing wavelength. The need for wavelength stability for wavelength division multiplexed (WDM) transmission systems is disclosed. Application of laser diodes for spectroscopic purposes is not disclosed. In addition, the patent application disclosed wavelength control through the utilization of optical feedback that is obtained from a dedicated diode laser control system. The control of wavelength stability requires significant additional electronics.

International Publication WO 01/20371 to Watterson et al. and entitled "Wavelength Reference Device" describes an apparatus for use in calibrating a tunable Fabry-Perot filter or tunable VCSEL to a precise absolute frequency and maintenance of that frequency using optical feedback derived from a Michelson interferometer. The drawbacks of this method are that the optical feedback system must be included in any application of a VCSEL, and a method of absolute lasing wavelength determination must be available. The desirable low cost feature of VCSELs relative to existing laser reference technology is negated by the described optical feedback system. The VCSEL lasing wavenumber control is provided by an additional optical feedback system. Further, the apparatus of Watterson et al. relies on absolute frequency to maintain a lasing wavenumber.

U.S. Pat. No. 6,069,905 to Davis et al. and entitled "Vertical Cavity Surface Emitting Laser Having Intensity Control" describes the incorporation of a photo detector into a VCSEL package for the purposes of intensity control. This method focuses solely on optical power and intensity regulation and control, which is not critical for the purposes of the application of VCSELs as references for interferometric spectrometers. Davis et al. do not disclose the control and correction of VCSEL lasing wavenumber shifts.

U.S. Pat. No. 5,267,152 to Yang et al. and entitled "Non-invasive Method and Apparatus For Measuring Blood Glucose Concentration" describes the use of solid state lasers as sources of electromagnetic radiation for the non-invasive measurement of blood glucose concentration. Yang et al. do not describe the use of a solid state laser as a wavenumber reference for interferometry. The control of the solid state laser current, voltage and temperature are discussed because the measurement of blood glucose concentration, as described in this patent, is dependent on these parameters.

U.S. Pat. No. 5,933,792 to Andersen et al. and entitled "Method of Standardizing a Spectrometer" describes the use of a standardization sample to determine a characteristic shape, which embodies the difference in response of an instrument over time or between instruments, for absorbance and wavenumber calibration. The limitation of this method is that the characteristic shape is used to correct spectra obtained at later times or on different instruments. The spectra themselves are not inherently correct. The disclosed apparatus does not deal with wavenumber calibration through control and correction of the optical component that determines the spectral wavenumber axis. Instead, it requires a characteristic shape that embodies the spectral differences to correct the spectral wavenumber axis.

In addition, U.S. Pat. No. 5,933,792 discloses a method of standardizing a Fourier transform infrared (FTIR) spectrometer that uses a HeNe laser as its reference. It does not discuss the use of a VCSEL as the reference for the FTIR spectrometer. The HeNe laser has relatively high cost, high power, generates more heat and occupies a large volume relative to a VCSEL. The present invention discloses the method and apparatus of a subsystem or subassembly necessary for successful use of a VCSEL as a reference for an interferometer in optical spectroscopy.

SUMMARY OF THE INVENTION

The present invention is directed to a subsystem for use in interferometry for optical spectroscopy applications which makes possible the use of a vertical cavity surface emitting laser (VCSEL) to serve as an accurate and precise reference laser as an alternative to the industry standard HeNe laser. The present invention offers substantial cost, size, heat and power consumption reductions compared to the HeNe laser. In preferred embodiments, the present invention makes feasible the use of the VCSEL as a reference for an interferometer by incorporating electronics to drive the VCSEL, a photodetector sensitive to the VCSEL output, and an algorithmic wavenumber shift estimation and correction algorithm or method which utilizes a known sample.

A preferred embodiment of the present invention is a subassembly for use in an optical spectroscopy system. The subassembly preferably includes an interferometer having optical components for receiving light and passing light along a defined light path. The optical components preferably include a beamsplitter that separates the light from a source into two portions and means for introducing a pathlength difference between the two portions. A vertical cavity surface emitting laser, including electronics to drive the vertical cavity surface emitting laser and project a beam therefrom is preferably operatively mounted on the interferometer with the beam following the defined light path to act as a reference laser for the interferometer. The interference pattern of the laser is received by a photodetector so that pathlength differences and an accurate digitized interferogram may be constructed for a sample under analysis. The vertical cavity surface emitting laser preferably includes means for temperature control and means for current control connected thereto along with computing means having therein an algorithm for correcting wavenumber drift by the vertical cavity surface emitting laser.

In preferred embodiments, the algorithm for correcting wavenumber drift by the vertical cavity surface emitting laser includes factors derived from spectroscopic analysis of a reference sample utilizing the interferometer and vertical cavity surface emitting laser of the subassembly. At least a portion of the generated spectrum is then compared to a known spectrum for the reference sample. The comparison can include analysis of the relative difference between the generated spectrum and the known spectrum of the reference at selected wavenumbers. Other types of algorithms can be utilized which rely on such methods as employing a derivative-based determination of wavenumber location of spectral features, a center of gravity based determination of wavenumber location of spectral features, an interpolation-based determination of wavenumber of location of spectral features or a wavenumber shift versus wavenumber regression to determine shift correction.

In an alternative embodiment, the algorithm for correcting wavenumber drift by a vertical cavity surface emitting laser can be derived from multiple spectroscopic analysis of a reference sample having a known spectrum utilizing a second interferometer and a second vertical cavity surface emitting laser of the same type as that utilized in the subassembly. The algorithm derived from the similar system can then be utilized as a predictor for performance of the vertical cavity surface emitting laser in the subassembly.

The vertical cavity surface emitting laser of the present invention also preferably includes means for temperature control and means for current control connected thereto. The means for temperature control preferably includes a temperature measurement device to provide a feedback signal to the control circuit, a set point signal, a Wheatstone bridge to compare the feedback signal to the set point signal, proportional integral and derivative (PID) filter to provide the control properties of the circuit, a reference voltage supply, and a MOSFET to regulate the output of the circuit using the signal obtained from the PID filter. A temperature monitor can also be included in the circuit. The means for current control preferably includes a precision voltage power supply, a precision resistor with low temperature coefficient to convert the output of the precision voltage supply to current, and a current monitor.

The reference sample having a known spectrum is preferably selected to include at least one rare-earth oxide. The rare-earth oxide may be doped into a diffusely reflective substrate or alternatively doped into a transmissive substrate. Preferred earth oxides include erbium oxide, dysprosium oxide, holmium oxide or samarium oxide. In alternative embodiments, the reference sample having a known spectrum can be a rare gas emission lamp which is selected from a neon emission lamp, a krypton emission lamp, an argon emission lamp or a xenon emission lamp. The reference sample could also include one or more etalons that may be measured simultaneously or in series.

In preferred embodiments, the subassembly is mounted in a spectrometer system that includes a sample holder. The reference sample is preferably measured while positioned in the sample holder.

DETAILED DESCRIPTION OF THE PREFERRED EMBODIMENTS

Figure 1:
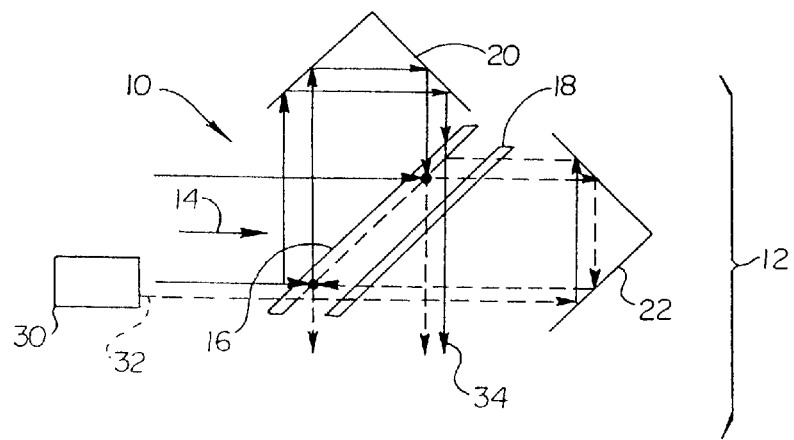
FIG. 1 is a schematic representation of a portion of an optical spectrometer including an interferometer having both a light source and VCSEL reference laser following defined light paths therethrough.

Until the late 1960's, FTIR spectrometry was largely unaccepted as a useful analytical method due in part to poor scan to scan reproducibility. The advent of rare-gas lasers, specifically the helium-neon laser, allowed the direct monitoring of the moving mirror position in an interferometer. Using a helium-neon (HeNe) laser, which can be obtained with wavelength stability to nine digits of precision, the position of the moving mirror could be elucidated by finding the zero crossings of the laser's interferogram. Consequently, interferograms can be digitized at precisely equal intervals of mirror position, where each interval corresponds to a distance of exactly half of a wavelength of the laser line. The result of the application of a HeNe reference was an internal wavenumber axis standard for measurements on FTIR spectrometers. In addition, some interferometric applications use integral numbers of laser zero crossings to define the total distance traveled by the moving mirror and thus define spectral resolution.

Helium-neon lasers have several disadvantages from a consumer applications standpoint, however. The primary disadvantages are size, cost, lifetime, and power consumption. The minimum size of a helium-neon laser cavity is fundamentally limited to approximately 6 inches in length. This limitation is imposed by the spacing between the two internal mirrors that form the Fabry-Perot resonator in the lasing cavity. The equation that determines the allowed lasing wavelengths for a given mirror spacing is given in Equation 1.

$$\lambda = \frac{2L}{n} \tag{1}$$

Where L is the distance between the two mirrors, $\lambda$ is the lasing wavelength for a given value of n, and n is a constant that is defined by the reflectivity function of the mirrors at the wavelength of interest. For the neon emission lines around 632.8 nm, the possible values of n limit the mirror spacing to around 6 inches.

While the cost of HeNe lasers is significantly lower than nearly every other type of laser, a spectroscopic grade HeNe and associated power supply is still presently around $500. This expense is a minor concern for laboratory Fourier transform infrared (FTIR) spectrometers, which can cost in excess of $50K. For instruments intended for the consumer market, however, the cost of the HeNe is significant and therefore affects the commercial feasibility of any product incorporating a spectroscopic system that requires a laser reference.

The lifetime of the HeNe laser is also a disadvantage. The typical lifetime of a HeNe laser is around 15,000 hours. Assuming constant use, a HeNe laser would need replacement approximately every two years. In laboratory spectrometers, the time and expense of HeNe replacement is usually a fairly minor concern when compared to the spectrometers initial and continuous operating costs. Consequently, the lifetime of HeNe lasers in laboratory spectroscopy has generally not been considered a disadvantage, but would be a disadvantage in a consumer product if replacement was required every two years.

The power supply requirements of a HeNe laser make its use in consumer devices difficult. In order to initiate lasing in a HeNe laser, a starting voltage of 5 to 12 kV must be applied. Once lasing has been initiated, a constant 1 to 3 kV at 3 to 8 mA must be supplied to maintain the laser's output. This corresponds to a possible 24 W of continuous power consumption. In addition, the stability of the supplied power is directly related to the stability of the laser emission. Consequently, a highly stable power supply is desirable. The design, operation, and size of a power supply that meets these requirements make it unattractive for a consumer product, especially if the device must be portable or battery powered.

The present invention is based on a subsystem that makes vertical cavity surface emitting lasers (VCSELs) a viable alternative to the HeNe laser as a reference in FTIR spectrometers. A representative interferometer that can incorporate the subsystem of the present invention is disclosed in commonly assigned U.S. patent application Ser. No. 09/415,600, filed on Oct. 8, 1999, and entitled "Interferometer Spectrometer with Reduced Alignment Sensitivity," the disclosure of which is incorporated by reference.

A schematic representation of a representative subassembly 10 of the present invention is depicted in FIG. 1. The subassembly generally includes an interferometer 12 that modulates sufficiently collimated light 14 directed to the subassembly 10 to create an interferogram that is received by a detector (not shown). The interferogram spatially encodes the spectrum collected from a sample or a source. In the embodiment depicted in FIG. 1, the interferometer 12 includes a beamsplitter 16 and the compensator optics 18, a fixed retro-reflector 20 and a moving retro-reflector 22. The collimated input light 14 impinges on the beamsplitter optic 16 and is partially reflected and partially transmitted by the coating on the back surface of the beamsplitter 16. The reflected light passes back through the beamsplitter optic 16 and reflects off the fixed retro-reflector 20 and back to the beamsplitter 16. The transmitted and reflected portions of the light recombine at the beamsplitter to create an interference pattern or interferogram. The amount of constructive and/or destructive interference between the transmitted and reflected beams is dependent on the spectral content of the collimated input beam 14 and on the optical path difference between the fixed retro-reflector 20 and the moving retro-reflector 22.

Figure 2:
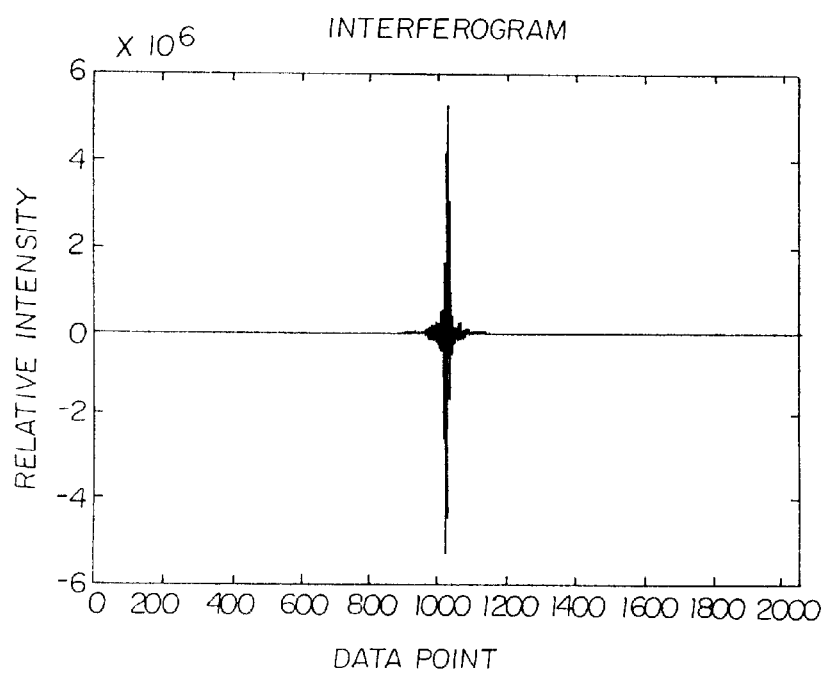
FIG. 2 shows a typical interferogram created by an FTIR spectrometer.

FIG. 2 shows a typical interferogram created by an FTIR spectrometer. At the point of zero path difference between the transmitted and reflected beams, there will be maximum constructive interference, and the centerburst of the interferogram is created. The interferogram is then focused onto a detector 232, as shown in FIG. 1. The detector 232 converts the optical interferogram into an electrical representation of the interferogram for subsequent digitizing by a data acquisition subsystem.

Figure 3:
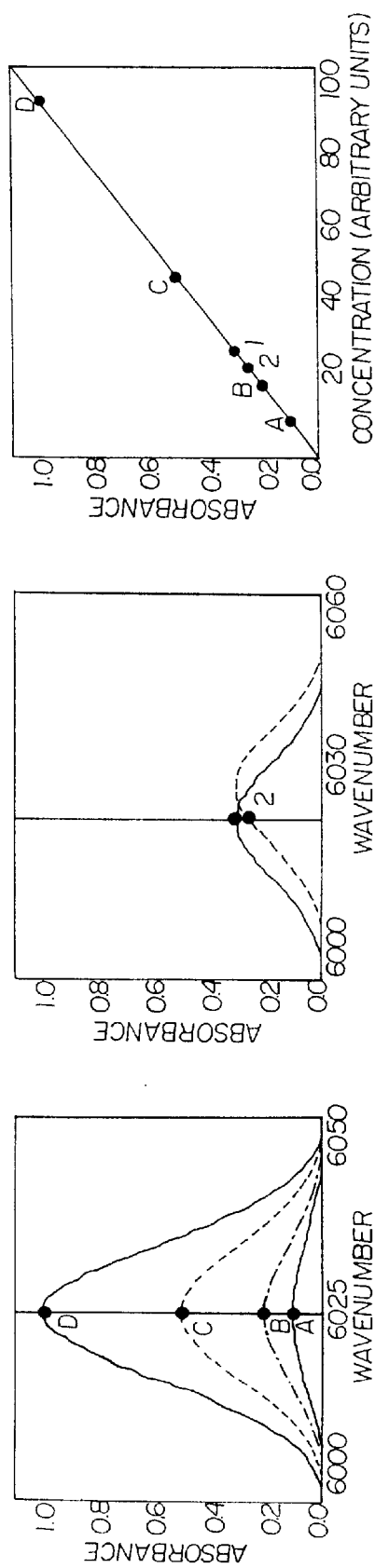
FIGS. 3A–3C graphically depict the effect of wavenumber axis instability on Beer's law predictions.

Also depicted in FIG. 3 is the reference laser assembly 30 of the present invention as described in detail below. The reference laser subsystem is a VCSEL package which preferably incorporates power control, temperature control, and a wavenumber axis correction based on an algorithm developed from known reference sample measurements on either the system of FIG. 1 or another similar system. The reference laser assembly generates an output beam 32 that is projected onto the beamsplitter 16. The portion of the beam is reflected to the fixed retro reflector 20 that in turn passes back to the beamsplitter 16. A portion of the laser beam 32 also is transmitted through the beamsplitter 16 and compensator optics 18 to the moving retro-reflector 22 and also back to the beamsplitter 16 where it is recombined with the portion of the beam reflected from the fixed retro-reflector to create an interference pattern based on the single wavelength of the laser with the resulting beam 34 being directed to a photodetector sensitive to the wavelength of the laser beam. As described in detail below, the reference beam allows determination of the moving retro reflector 22 position at any time and provides spectral resolution and wavenumber axis determination.

Similar to helium neon lasers, VCSELs offer circular beams with low beam divergence that makes them suitable for use as references in interferometry. In addition to their desirable optical properties, VCSELs offer substantial improvements over HeNes in several categories important for a mass-produced commercial device. The size of a typical VCSEL package is approximately 5 mm in each dimension, which results in a volume of approximately 0.125 cm$^3$. In comparison to a typical HeNe, which has a volume of approximately 75 cm$^3$, a VCSEL is 600 times smaller.

Another significant concern for a consumer device is power consumption. VCSELs operate on 2 to 10 mA at less than 5 V. Assuming the worst case, VCSEL power consumption is 0.050 W. A HeNe laser, in contrast, requires 1 to 3 kV at 3 to 8 mA. The corresponding range of power consumption is 3–24 W. Consequently, at worst, VCSELs consume about 1/60 of the power of a HeNe.

Due to the vast quantities required for communications applications, VCSELs can be obtained for less than $20. Excluding the costs of power supplies and supporting electronics, VCSELs present over an order of magnitude lower cost versus HeNes. VCSELs also offer lifetimes in the millions of hours. This corresponds to over 200 years of continuous use. VCSELs could represent an inexpensive part for a consumer device that will likely never fail or need to be replaced.

As mentioned above, the primary requirement of a reference laser in FTIR spectroscopy is wavelength stability of the laser's emission. Standard VCSELs have been shown to fall short of their HeNe counterparts in this area. It has been found that the VCSEL architecture results in its lasing wavenumber being dependent upon temperature, drive current, and long-term sources of drift such as mirror resistance changes. Typical sensitivities are on the order of 3 to 5 (cm$^{-1}$/mA) and 0.8 to 1.0 (cm$^{-1}$/° C.) for current and temperature, respectively. In order to overcome the stability drawbacks, a device and method for application of VCSELs as references for interferometry has been developed and described below which includes temperature and current control, and an algorithm based wavenumber drift estimation and correction method.

It has been found that appropriate temperature and current control devices largely eliminate the corresponding sources of VCSEL drift; however, long-term drift of VCSELs, possibly due to aging effects, still presents a problem for interferometric applications. In addition, individual VCSELs will lase at different wavelengths than others even while at the same temperature and drive current. In order to address these issues, a method, which uses a spectral reference and wavelength shift estimation algorithm, was developed to measure and correct the spectral effects of VCSEL shifts. The method and device or subsystem thus preferably includes temperature and current control systems and algorithmic wavenumber shift estimation and correction.

In spectroscopy applications with the present invention, stable spectral resolution and wavenumber axis have been found essential primarily for three reasons. The first of these is that many spectroscopic applications require a minimum analyte signal-to-noise ratio in order for a property of interest to be elucidated. Often, the signal-to-noise ratio of a single scan or acquisition of an instrument does not meet this threshold. In cases where noise is white, one technique that can be used in preferred embodiments of the present invention is to enhance the signal-to-noise ratio by the coherent addition or averaging of multiple equivalent scans or acquisitions. The idea behind this coherent addition is that spectral features of a stable sample will be theoretically constant in intensity, spectral resolution, and wavenumber position. Assuming that the spectral resolution, wavenumber axis, and the wavenumber locations of the discrete spectral data points are consistent across scans, multiple scans of a stable sample can be averaged to reduce spectral noise and correspondingly improve the signal-to-noise ratio.

The improvement in signal to noise is defined by the square root of the number of averaged scans. In cases where the short- or long-term wavenumber stability of the reference laser is poor, chemically and physically non-equivalent spectral values are averaged, which results in a spectrum that does not exhibit the desired signal-to-noise ratio improvement and will appear distorted relative to the individual scans. Depending upon the severity of the wavenumber axis instability, the averaging process can result in a spectrum that demonstrates a degraded, rather than improved, relationship to the desired analytical property of interest (often concentration).

The second reason why wavenumber stability has been found critical is the dependence of many spectroscopic applications upon a calibration that relates the instrument response to a chemical or physical property of the sample. For example, the Beer-Lambert law linearly relates the absorption on an analyte at a specific wavelength to its concentration. In order to perform quantitative predictions of analyte concentrations in unknowns, a univariate calibration can be performed by plotting the absorbance values at a specific and consistent wavelength for multiple samples of known composition versus the analyte concentration. If undetected reference laser wavenumber shifts exist between the calibration spectra, the accuracy and precision of the calibration will be degraded because the selected absorbance values used in the calibration will not correspond to their true values.

In a similar manner, for the case of lasing wavenumber shifts between the calibration spectra and prediction spectra, the accuracy of the predictions will be poor because the absorbance values used in the predictions will not represent the same spectral location as the absorbance values used in the calibration. In addition, the absorbance values themselves will not be consistent, regardless of wavenumber position, due to the change in spectral resolution. An example of the error due to a spectral wavenumber axis shift is given in FIGS. 3A, 3B and 3C for a univariate Beer's law analysis.

Four simulated calibration spectra with no wavenumber shifts are shown in FIG. 3A. Points A through D correspond to the absorbance maxima for each of the four simulated spectra. These points, in conjunction with their known concentrations, are used to generate the calibration curve, shown in FIG. 3C. FIG. 3B, however, shows two simulated spectra, which are identical except for the presence of a wavenumber shift between them, whose analyte concentration will be predicted using the calibration curve. Points 1 and 2 in FIG. 3B are the absorbance values of the prediction spectra that correspond to the wavenumber used to generate the calibration curve. Although the two spectra demonstrate the same peak magnitude of absorbance, a prediction error between points 1 and 2 is observed in FIG. 3C. In this case, point 1 yields the correct concentration prediction because its corresponding spectrum has no wavenumber shift relative to the calibration spectra. Point 2 yields a concentration prediction that is below its true value because the absorbance value used for the prediction was not the desired peak maximum. This example shows that if wavenumber shifts are not explicitly corrected for, a prediction error will result.

Similar to univariate analysis, wavenumber axis and spectral resolution shifts in multivariate analysis have been found to result in several undesirable consequences. The observed errors are dependent upon whether the shifts occur during the acquisition of calibration spectra or between the acquisition of the calibration and validation spectra. Shifts that occur within the calibration spectra represent an additional dimension of complexity beyond absorption versus wavenumber that must be modeled. The additional complexity in the spectra requires additional factors to be included into the model to account for the wavenumber and spectral resolution shifts. The additional spectral complexity will result in poorer predictions due to a reduction in net analyte signal (NAS), where the NAS is defined as the portion of the spectrum that is specific for the analyte's concentration levels because it is orthogonal to all other sources of spectral variance.

The effects of a lasing wavenumber shift that occurs between calibration and prediction can be explained by considering the regression coefficients obtained from a Partial Least Squares (or other multivariate) calibration and the spectrum to be predicted. Concentration predictions are generated by vector multiplication of the unknown spectrum and the regression coefficients. The output of this multiplication is the concentration prediction. In this process, the regression coefficients generated from calibration are essentially used to weight the absorbance values in the unknown spectrum. Because each of the regression coefficients corresponds to a specific wavenumber in the spectrum and a specific spectral resolution, a wavenumber shift between the calibration and prediction spectra will result in each wavenumber position in the prediction spectrum being weighted by an inappropriate regression coefficient. An increase in prediction errors is a direct result of the weighting errors.

The third reason why reference laser wavenumber stability has been found critical in spectroscopy applications of the present invention is qualitative analysis. One of the primary applications of spectroscopy is to determine the chemical composition of samples. Theoretically, each infrared active molecule will exhibit a unique mid-infrared, and therefore near-infrared, spectrum. A molecule's unique spectrum serves as its fingerprint and is used to prove its presence in a sample. Often, chemically similar molecules may have nearly identical spectra that differ only by subtle shifts in peak locations and minute changes in absorbance magnitude. In this situation, undetected shifts in the spectrometer's wavenumber axis or spectral resolution can potentially result in misidentification of unknown samples.

The purpose of a reference laser in an interferometer is to provide an internal wavenumber reference that simultaneously allows the interferogram to be sampled at discrete intervals and define the total moving mirror travel. In order for an internal wavenumber reference to be effective, it must be both wavelength stable and its emission wavelength must be known. This is because the spectral wavenumber axis is calculated relative to the interferogram of the reference. Consequently, if the reference's lasing wavenumber is unknown, the spectral wavenumber axis cannot be calculated and the spectral resolution will be uncertain. In addition, any source of reference wavenumber drift or error relative to the measured spectrum will result in an incorrect spectral wavenumber axis and an associated change in spectral resolution.

Two principle sources of reference error in an FTIR have been identified. The first of these is a real, but undetected, shift in the laser's emission wavelength. In many infrared applications, the zero crossings of the reference's interferogram are used to digitize the spectral interferogram. The result is a spectral interferogram with all points corresponding to a mirror position that is a multiple of a fraction of the reference's wavelength. This condition not only satisfies a basic requirement for the use of the Fourier transform (FFT) algorithm, but it allows the direct calculation of the spectral wavenumber axis following the Fourier transformation. The equation for the wavenumber axis calculation for a two-sided interferogram is given below.

$$v_i = (i-1) \times (2v_R/N) \tag{2}$$

Where $v_i$ is the spectral wavenumber corresponding to the $i^{th}$ point of the spectrum, $v_R$ is the wavenumber of the reference, and N is the total number of points in the spectrum. If $v_R$ is not equal to the true reference wavenumber, then the calculated spectral wavenumber axis will be shifted from the true spectral wavenumber axis. Equation 2 shows that the magnitude of the shift error linearly increases with wavenumber in a "stretching" type of effect because $v_i$ is calculated by multiplication involving the reference's wavenumber.

Figure 4:
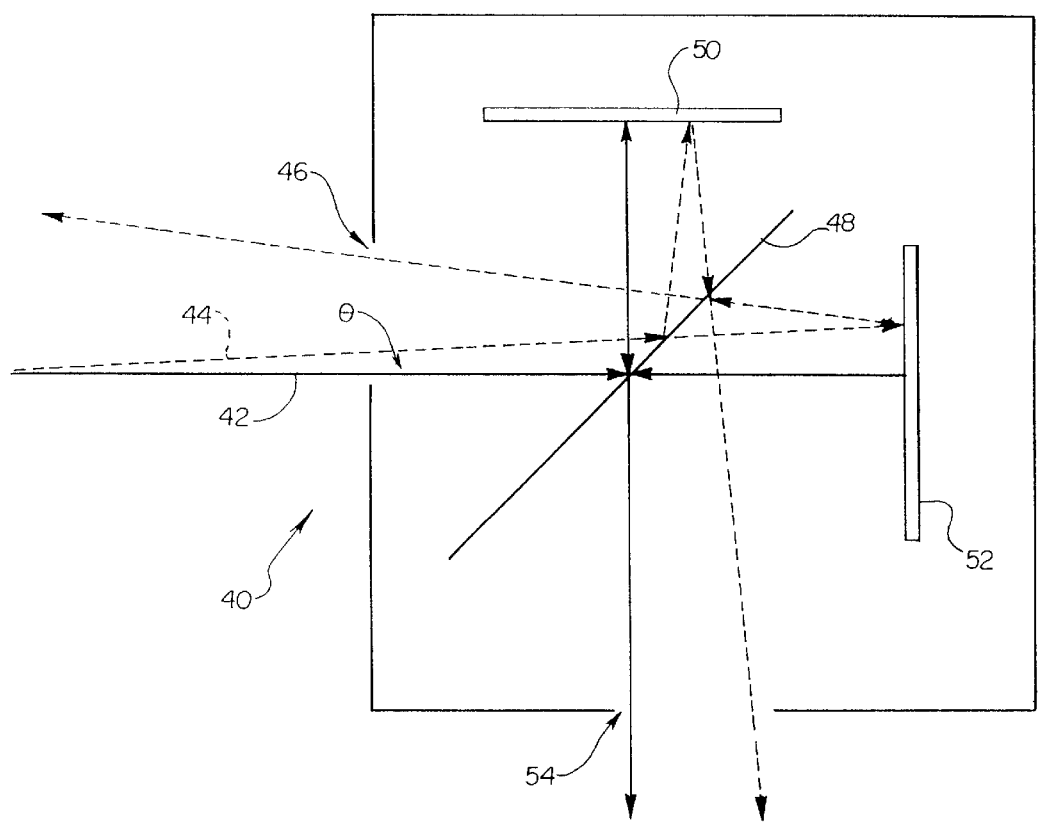
FIG. 4 is a diagram illustrating wavenumber shift due to alignment error.

The second source of reference error is an alignment difference between the laser beam path and the spectral beam path. The important concept behind why the alignment of the spectral and reference beams affects the accuracy of the wavenumber axis is that the internal reference is a true reference only when the perceived wavenumber of the reference relative to the spectral beam is known. In a typical Michelson interferometer, the perceived reference wavenumber and true reference wavenumber are equal only when the reference and spectral beams have exactly the same path lengths through the interferometer. FIG. 4 schematically shows an example of this effect.

FIG. 4 diagrammatically depicts a first beam 42 and second beam 44 passing through an interferometer 40 with an input angle, θ, between them. As depicted, each beam 42,44 passes through an entrance aperture 46 and engages a beamsplitter 48. A portion of the light energy from each beam 42,44 is reflected by the beamsplitter and directed to a fixed mirror 50, while the other portion of each beam 42,44 passes through the beamsplitter to impinge a moving mirror 52. The light energy returning from the fixed mirror 50 and moving mirror 52 is directed to an exit aperture 54. Assuming that both beams 42,44 are monochromatic and of the same wavenumber, the angle between the two beams is their only difference. The angle results in the two beams having different path lengths through the interferometer 40. Equation 3 shows the relationship between θ and the pathlength difference.

$$X = \frac{2l}{\cos(\theta)} - 2l \tag{3}$$

Where X is the pathlength difference between the two beams and l is the distance the moving mirror 52 has been moved from zero retardation. A consequence of this path difference is that for values of l other than zero, a phase difference that varies with l will exist between the first beam 42 and the second beam 44. It is this phase difference that will make the apparent wavelength of the second beam 44 longer (and the wavenumber smaller) than that of the first beam 42, although they are known to be identical. Extending this example to a polychromatic beam to represent a spectral beam and considering the beam to be the reference beam shows that any angle between the beams results in an incorrect wavenumber axis.

The spectral resolution of an interferometer is determined by the distance the moving mirror travels from the location of zero path difference. The zero crossings of the reference laser's interferogram allow the precise determination of the moving mirror's location assuming that the lasing wavenumber of the reference laser is accurately known. Each zero crossing is separated from its nearest neighbors by ½ the lasing wavelength of the reference laser. Using the zero crossing spacing and the desired spectral resolution, the number of zero crossings required to achieve the desired spectral resolution can be calculated. In situations where a reference laser wavenumber shift has occurred, the number of zero crossings required to achieve the same spectral resolution will change. Similar to the above wavenumber axis example, any angle between the reference laser beam and the spectral beam will result in a spectral resolution difference between the two beams.

In a preferred embodiment of the subsystem or device and method of the present invention, features are included in four categories: mode operation, current control, temperature control, and wavenumber shift estimation and correction. It is recognized that features from these categories for the use of a VCSEL reference in interferometry to can be considered in any, or in a combination of any, of the methods or elements presented in any of the categories that result in the desired laser wavenumber stability.

VCSELs are available which lase with either a single or multiple modes. Each lasing mode of a VCSEL will exhibit a specific bandwidth that is dependent upon the VCSEL's lattice architecture. The primary requirement of a reference in interferometry is that it must have a sufficiently narrow bandwidth such that the interferometer perceives the wavenumber of the reference to be constant over the entire modulation range (typically mirror travel). The figure of merit for this criterion is the coherence length of the reference. The coherence length is defined as the extent in space over which a light wave behaves sinusoidally. In a Michelson interferometer, a reference laser's coherence length must be longer than the optical path difference required to achieve the desired resolution. One skilled in the art can determine the minimum coherence length for an application using the spectrometers optical configuration, spectral range, and required resolution. From this, the choice between a single-mode and multi-mode VCSEL can be made.

The present invention also includes methods and apparatus that make it possible to use a multi-mode VCSEL as the FTIR reference laser for spectral resolutions higher than supported by the coherence length of the multi-mode VCSEL. The following paragraphs describe an embodiment of a multi-mode VCSEL coupled with a solid Fabry-Perot (FP) etalon to select a single mode and reduce the amplitude of adjacent modes in order to effectively increase the coherence length of the emitted light and thereby support the desired spectral resolution.

In order to be useful as a wavelength reference in an FTIR spectrometer, a VCSEL must have a coherence length long enough to provide sufficient modulation over the entire optical path difference (OPD) range used by the interferometer. The OPD requirements are dependent on the desired spectral resolution. The higher the desired resolution, the greater must be the OPD and the greater must be the coherence length of the VCSEL. A typical 850 nm, multi-mode VCSEL will emit at a number of wavelengths, often over about a 0.85 nm range. Furthermore, the center wavelength of this group might vary from VCSEL to VCSEL over about an 840 to 860 nm range. This kind of VCSEL is suitable for use only in very low-resolution FTIR spectrometers. For example, an instrument with a resolution of 32 $cm^{-1}$ will require a bandwidth of less than 0.2 nm in order to provide a sufficient coherence length to cover the required OPD range. One way to achieve this coherence length is to use a single mode VCSEL. The single mode VCSEL emits only at a single wavelength, with a bandwidth typically much less than 0.2 nm.

To increase the coherence length of a multi-mode VCSEL, a filter with a narrow bandwidth can be introduced to select only one of the modes in the multi-mode device. Continuing with the above example, the filter must have a bandwidth of less than 0.2 nm, and at the same time must be tunable over the 840 to 860 nm range to match the expected output range of a variety of VCSELs. A multi-layer dielectric filter on a glass substrate can be made with the required bandwidth, and it can be tuned by a few nm by tilting it relative to the propagation axis of the light from the VCSEL. The VCSEL itself could be tuned over a small range by changing its temperature or current. A typical VCSEL, for example, has a temperature coefficient of around 0.06 nm per degree C. and a current coefficient of around 0.4 nm per mA. Since other operating considerations define a narrow acceptable range of current and temperature, it has been found that one cannot tune the VCSEL more than about 1 nm using these parameters. Thus, it is not practical to cover the typical range of wavelengths expected to be encountered in a normal production run of VCSELs. In order to use a filter of this type to select a single mode, the filter would have to be custom made for each VCSEL, becoming an impractical proposition.

A preferred approach is to use a Fabry-Perot etalon. Such devices are well known in the art and characteristic equations describing their performance can be found in many textbooks, such as M. Francon, 1966, *Optical interferometry*, Academic Press—New York. A high efficiency FP etalon can be made by placing a multi-layer dielectric reflective coating on the two opposite surfaces of a thin parallel plate of a refracting material, such as glass or fused silica. An FP etalon has the unique property that it can be made to transmit a narrow bandwidth of light at a number of evenly spaced wavelengths simultaneously. This spacing is often referred to as the free spectral range. The free spectral range is determined by the thickness of the parallel plate, and the bandwidth and transmittance are determined by the surface reflectances. Such a device can then be used in the following way: first, choose a plate thickness that will set the free spectral range at slightly greater than the multi-mode bandwidth, and then choose a coating reflectance that will provide a narrow enough bandwidth to give the required coherence length. Continuing with the example above, choose a free spectral range of 1 nm and a bandwidth of 0.2 nm. Using equations found in the cited reference, it has been found one can use a fused silica plate with a thickness of approximately 0.24 mm and a reflectance of about 0.54. Increasing the plate thickness will reduce the free spectral range, and increasing the reflectance will reduce the bandwidth of the passband. All that remains then is to be able to adjust either the VCSEL wavelength or the etalon passband to center the passband on the strongest emission line of the VCSEL. Since the passband opens at intervals of 1 nm, the maximum wavelength adjustment to be made now is 1 nm. This may be accomplished by either adjusting the VCSEL temperature and current or by tilting the etalon. A 4-degree tilt will change the passband center wavelength by around 1 nm. Thus, with the present invention, one is able to select a single mode from the VCSEL without custom building a filter for each VCSEL in spite of the fact that the exact wavelength of operation varies from VCSEL to VCSEL over a large range.

Two restrictions have been found when using an etalon in this way. The first is that the temperature range of operation of the etalon may need to be restricted. Temperature change in general causes both the refractive index and thickness of the etalon substrate to change, which in turn changes the passband center wavelength. The allowable temperature change will depend on the material chosen for the etalon substrate and on the allowable change in wavelength. In order to minimize this effect, one can choose a material with a low thermal expansion coefficient and a low or negative temperature coefficient of refractive index. If fused silica is selected for the substrate in the example above, a 2.7 degree C. temperature change will move the passband wavelength by about 0.02 nm. This would probably be an acceptable shift for an etalon with a bandwidth of 0.2 nm.

The other restriction is that for good rejection of adjacent modes, the etalon must be used in a beam of light for which the angle of incidence variation on the etalon is small. The acceptable range of angles through the etalon is dependent on the required etalon bandwidth and on the mean angle of incidence on the etalon. The effect of angle divergence through the etalon will be to increase the bandwidth. The passband center wavelength is proportional to the cosine of the angle of refraction inside the etalon plate. Two ways of minimizing the effect of angle variation have been found. One is to operate the etalon with minimum tilt relative to the beam axis, relying more on temperature and current adjustment to match the VCSEL wavelength to the etalon passband. The other is to use a high refractive index material for the etalon plate.

Since choice of etalon material is often dictated by other factors, such as transmittance and thermal coefficients, and since it is believed desirable to be able to use tilt as a means of adjusting the passband center wavelength, an alternative way to reduce the angle of incidence variation of the laser light on the etalon was developed. The divergence angle range of a VCSEL can be a few degrees for some VCSELs. In an FTIR spectrometer application, this range of angles can be reduced to a small value before being directed through the interferometer by a collimating lens. The proper location for an etalon with planar surfaces in this kind of system would be in the collimated portion of the beam. Because the emitting area of a VCSEL is very small, a collimating lens can be very effective in reducing the angle range. For example, in a VCSEL with a source diameter of 15 microns, a divergence half angle of 10 degrees and a perfect collimating lens with a focal length of 6 mm, the beam will have a diameter of about 2 mm and a range of angles in the collimated beam of about plus and minus 0.07 degrees. Continuing with the fused silica etalon described in the example given above, at a tilt angle of 4 degrees the passband would be broadened by about 0.07 run by this divergence angle range. Although this is a significant fraction of the 0.2 nm design goal bandwidth, it would be acceptable in many cases. The reflectance of the surfaces could also be raised to compensate for this broadening although some reduction in total transmittance of the desired spectral line might be experienced.

Another effective way of reducing the range of angles through the etalon is to build the etalon with spherical surfaces rather than flat surfaces. In this construction, the distance between the two surfaces is made constant by making the radius of curvature of the two surfaces different by an amount equal to the thickness of the etalon, making the surfaces concentric about a common center of curvature. The proper location for this kind of etalon would be in front of the emitter, placing the emitter at the center of curvature. It is still possible to tilt an etalon of this construction to tune the passband center wavelength. The ideal tilt rotation axis will be near the mid point of the etalon, between the two surfaces, in order to minimize lateral translation of the curved surfaces.

Thus by either using a single mode VCSEL or a multimode VCSEL in combination with an FP etalon, we can achieve the coherence length necessary to support he desired spectral resolution for the FTIR spectrometer. The next steps in using a CSEL as the reference laser include determination of the proper current control and temperature control for the VCSEL.

High precision current supplies can be designed using integrated circuits offered by several suppliers. However, for the present application, it has been found that because resistance changes as a function of temperature for most materials, the current delivered by a power supply will vary to some extent with environmental conditions. This variation has been found to be sufficient to cause difficulty in using the VCSEL as a reference laser unless a design criterion is the temperature coefficient of each circuit component. The circuit design itself can also be used to reduce the overall circuit's sensitivity to temperature changes.

Figure 5A:
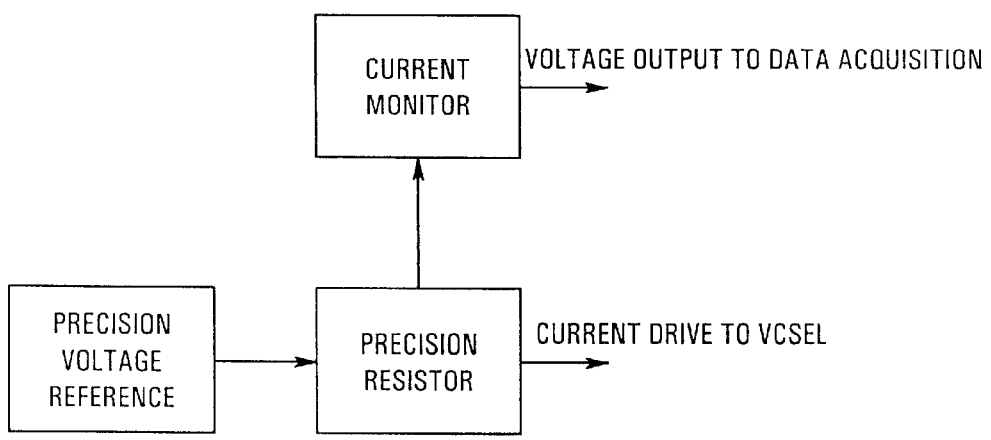
FIG. 5A is a block diagram of a generalized current supply.
Figure 5B:
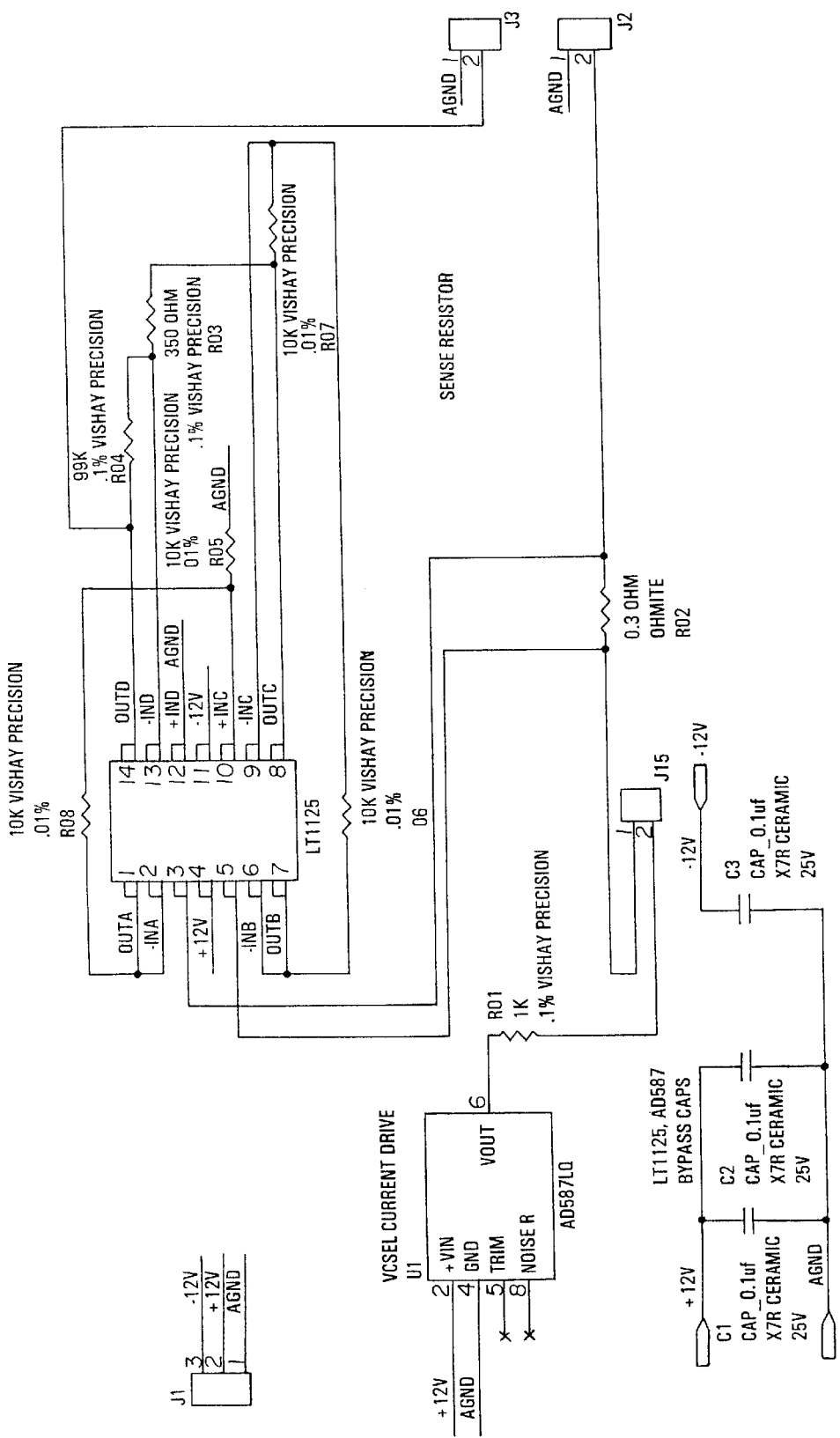
FIG. 5B is a diagram of an exemplary VCSEL drive current circuit.

For a current supply for a VCSEL reference in interferometry, the first step has been found to be to determine the minimum current stability requirement using the minimum wavelength stability requirement and the VCSEL's current coefficient. From these values, appropriate circuit components and designs can be chosen such that the total expected environmental drift does not result in drive current variation beyond tolerable levels. FIG. 5A is a general block diagram of a current power supply. FIG. 5A shows a precision voltage power supply that provides input to a precision resistor with low temperature coefficient that converts the output of the precision voltage supply to current. A current monitor is also included in the block diagram. FIG. 5B is a block diagram that shows the key components of an embodiment of a precision VCSEL current supply designed using components with very low temperature coefficients. The circuit design also includes the ability to directly monitor the current delivered to the VCSEL.

Figure 6:
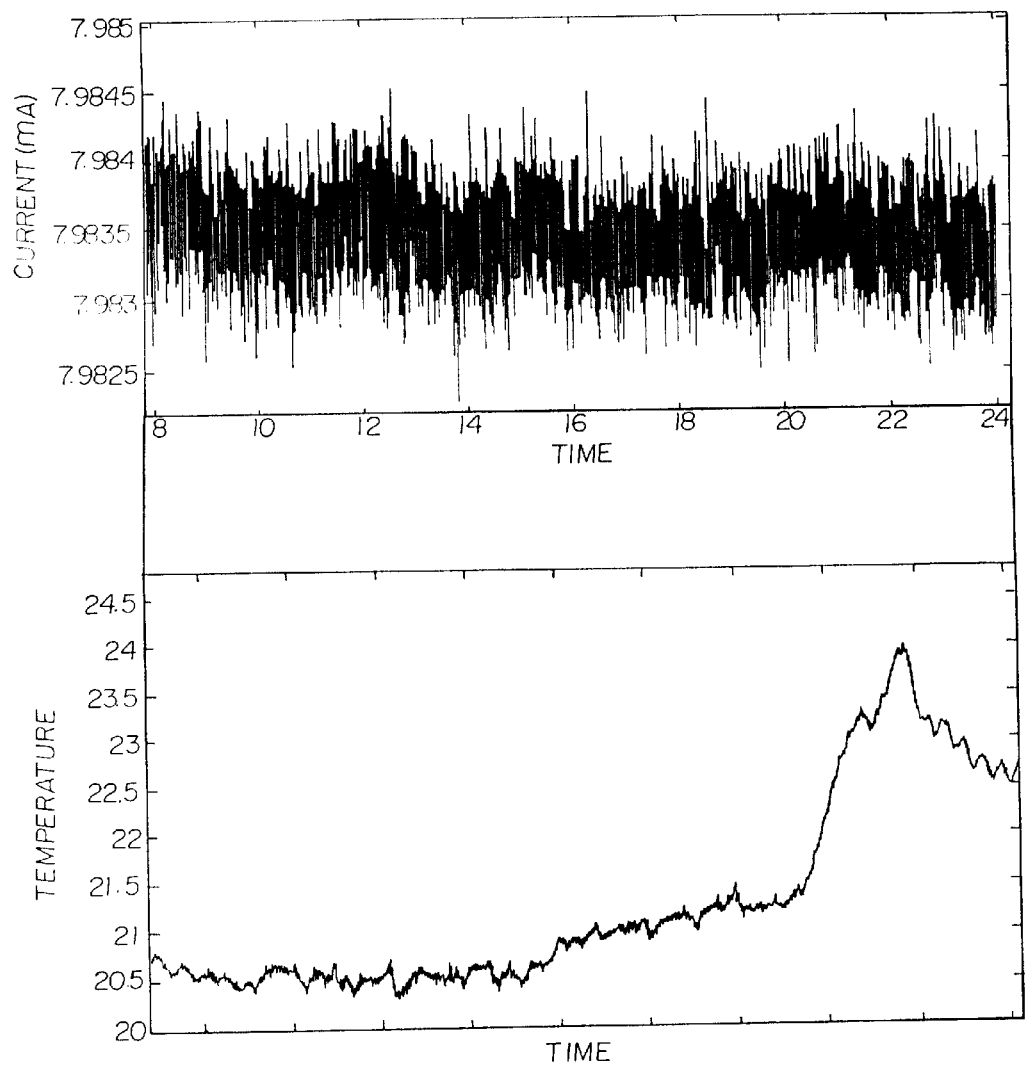
FIG. 6 is a graph depicting VCSEL drive current and ambient temperature over time for the system of FIG. 5B.

The resistors in FIG. 5B are preferably constructed from metal foil having about 0.6 ppm or less temperature coefficients, and the integrated circuits are preferably constructed with about 5 ppm or less temperature coefficients. The current output of the circuit is preferably about 8.00 mA with a stability of about 0.05 $\mu A/^\circ$ C. based upon the circuit design and component temperature coefficients. Using a typical value of 5 $cm^{-1}$/mA for a VCSEL current coefficient, the wavelength drift due to current supply drift will be about $2.5 \times 10^{-4}$ $cm^{-1}/^\circ$ C. FIG. 6 shows the monitored drive current supplied to a VCSEL and the corresponding environmental conditions for a test conducted using the drive circuit of FIG. 5B. The plots in FIG. 6 span approximately 10 hours. The noise in the current measurement is a function of measurement noise and is not reflective of the actual current signal to noise. The key importance of FIG. 6 is that there is no correlation in current output and ambient temperature. Because VCSELs have been found to exhibit long-term lasing wavenumber drift in addition to drift caused by drive current variation, the current supply need only be stable over a short term.

Long-term VCSEL wavenumber stability and the use of an algorithmic correction of VCSEL shifts are discussed below.

Because VCSELs have temperature coefficients on the order of 1 $cm^{-1}/^\circ$ C., they must be temperature controlled in order to insure short-term stability. The two choices for temperature control are to heat and stabilize the VCSEL above ambient temperature, or to cool and stabilize the VCSEL below ambient temperature. Regardless of the choice of heating or cooling, the mechanical design of the VCSEL package of the present invention in preferred embodiments is such that heat transfer between the cooler/heater and the VCSEL die itself is optimized. The resulting heating/cooling system will demonstrate the tightest control around any desired set point temperature.

Figure 7A:
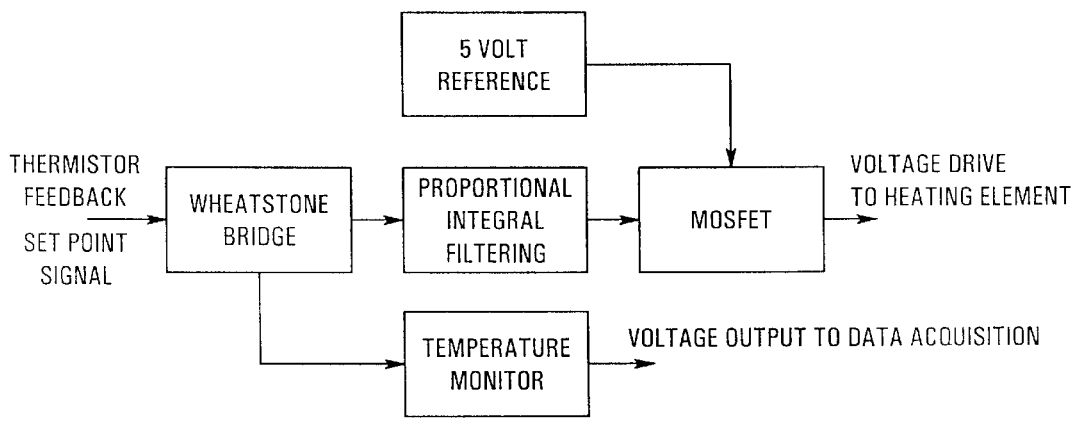
FIG. 7A is a block diagram of a generalized temperature control circuit.
Figure 7B:
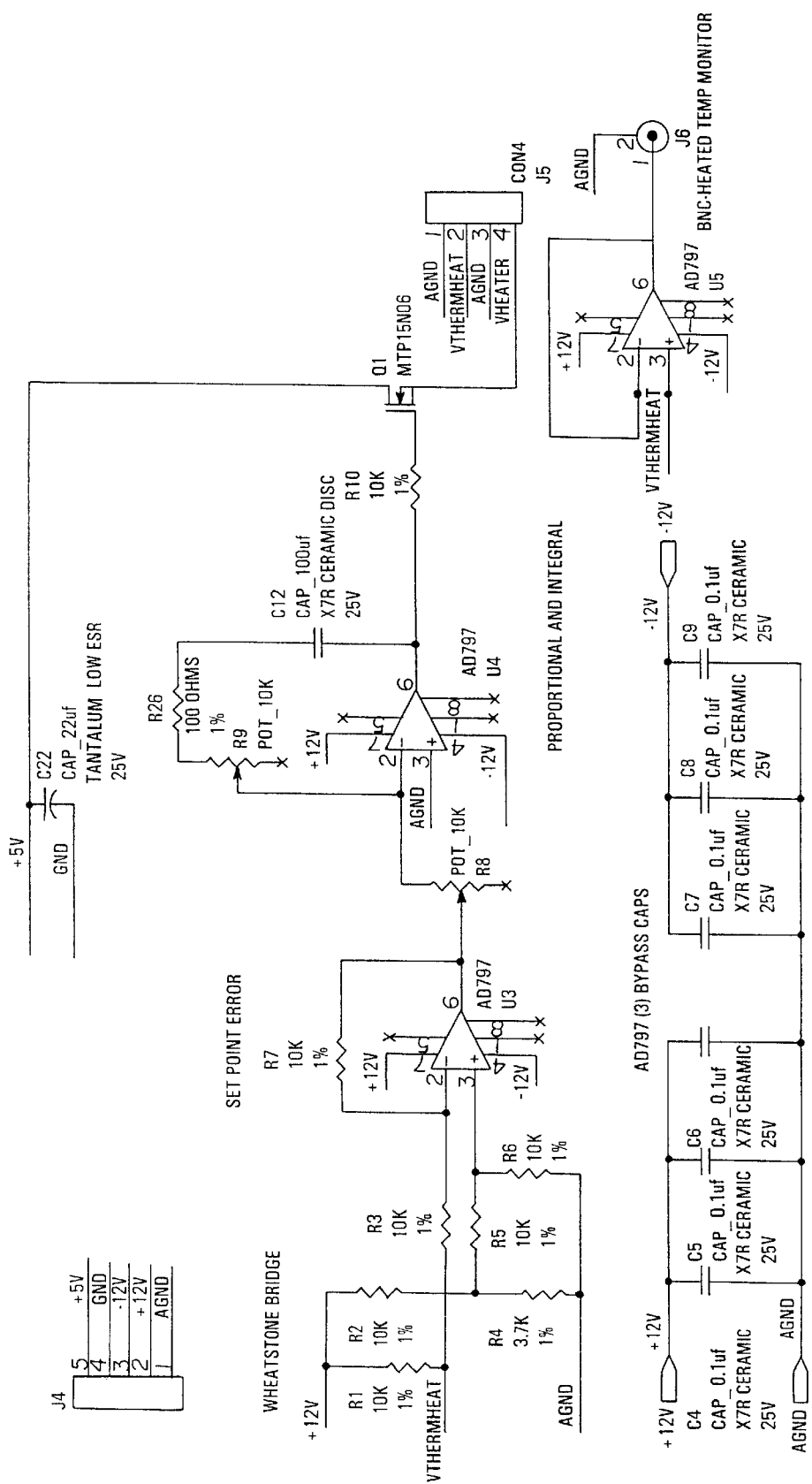
FIG. 7B is a diagram of an exemplary VCSEL heater control circuit.
Figure 8:
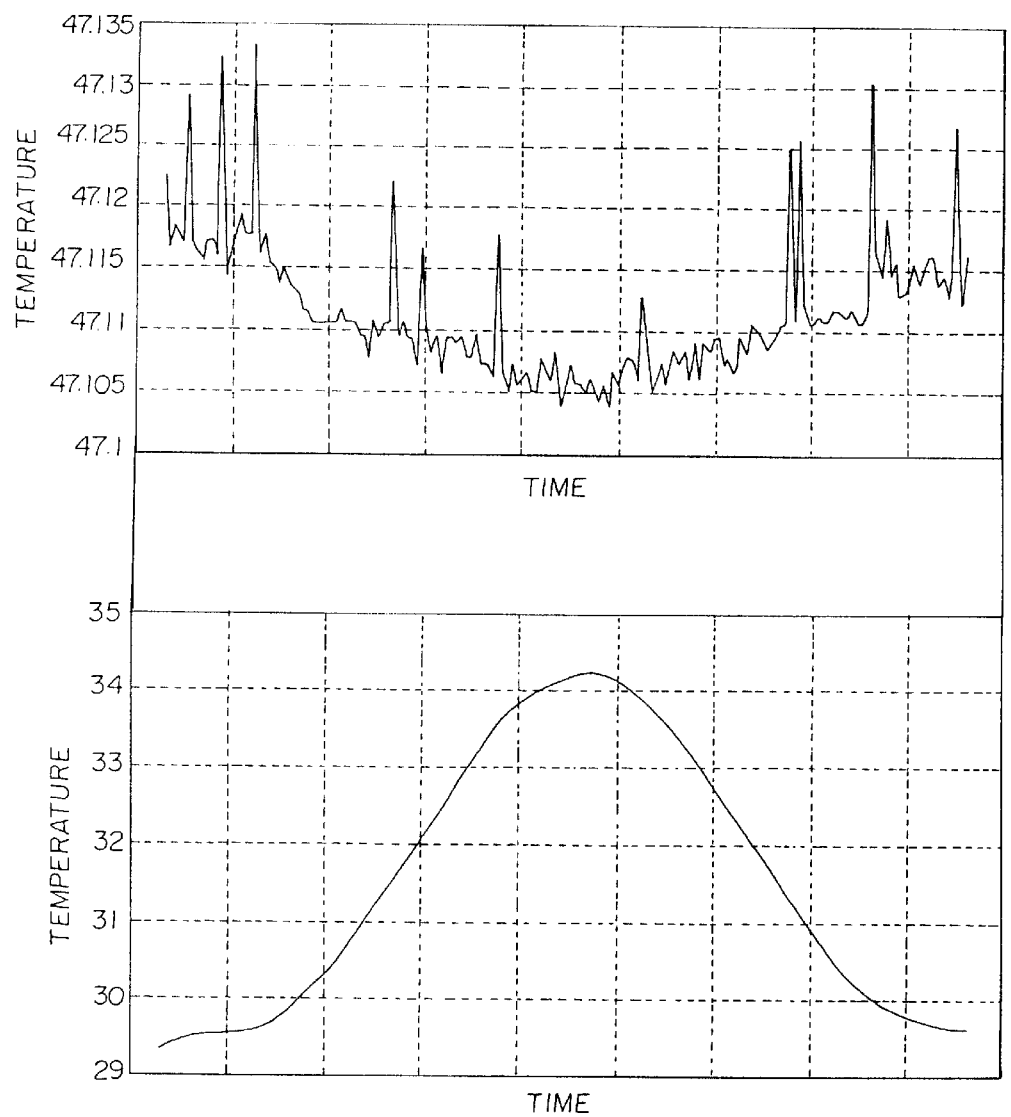
FIG. 8 is a graph depicting heated VCSEL and ambient temperature over time for the system of FIG. 7B.

An embodiment of a heated VCSEL package can be obtained using a heating element and a Thermistor feedback control circuit. A block diagram of a general temperature control circuit is shown in FIG. 7A. FIG. 7A shows a temperature measurement device to provide feedback signal to the circuit, a set point signal, a Wheatstone bridge to compare the feedback signal to the set point signal, proportional integral and derivative (PID) filter to provide the control properties of the circuit, a reference voltage supply, and a MOSFET to regulate the output of the circuit using the signal obtained from the PID filter. A temperature monitor can also be included in the circuit. A specific embodiment of a temperature control circuit is shown in FIG. 7B. The amount of heat generated by the heating element is determined by the voltage output of the heating circuit. A Thermistor, or other temperature measurement device, is incorporated into the mechanical design in a manner such that it accurately reflects the VCSEL temperature. The output of the circuit is dependent upon the Thermistor signal such that the output is zero when the Thermistor reads a temperature higher than the set point temperature and maximum voltage when the Thermistor reads a temperature well below the set point. In regions where the Thermistor temperature is near the set point temperature, the circuit output lies somewhere between zero and the maximum output. FIG. 8 shows the measured Thermistor temperature over the course of approximately 18 hours of heated VCSEL operation along with the ambient temperature of the room. The total VCSEL temperature variation over the time period is 0.01° C., which corresponds to a VCSEL lasing wavenumber shift of about 0.01 cm$^{-1}$ assuming a typical VCSEL temperature coefficient value.

Figure 9A:
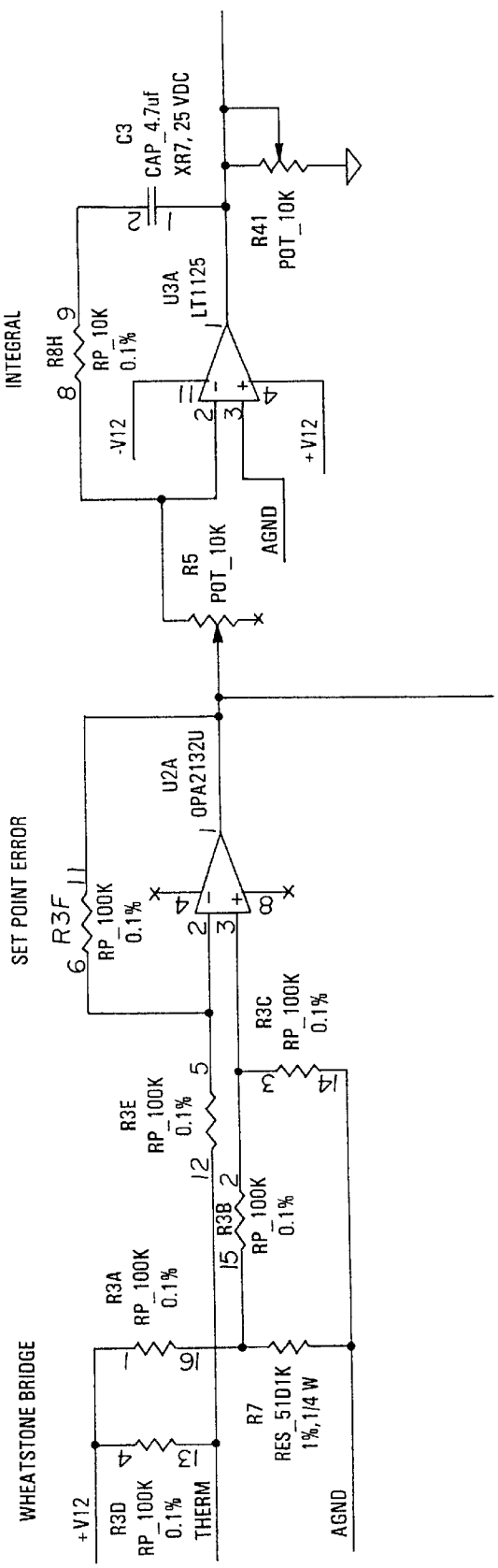
FIG. 9 is a diagram of an exemplary VCSEL TE cooler control circuit.
Figure 9B:
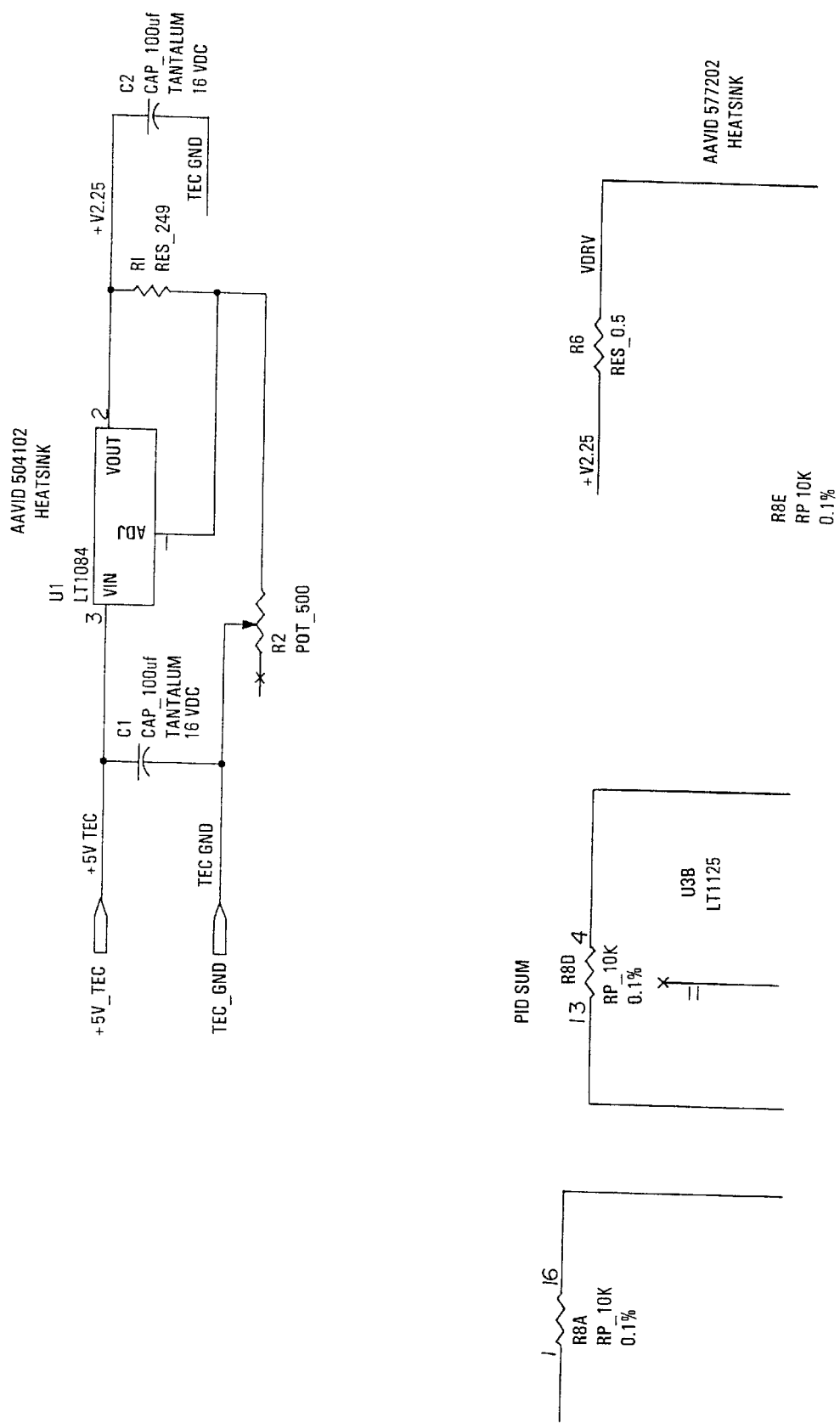
Figure 9D:
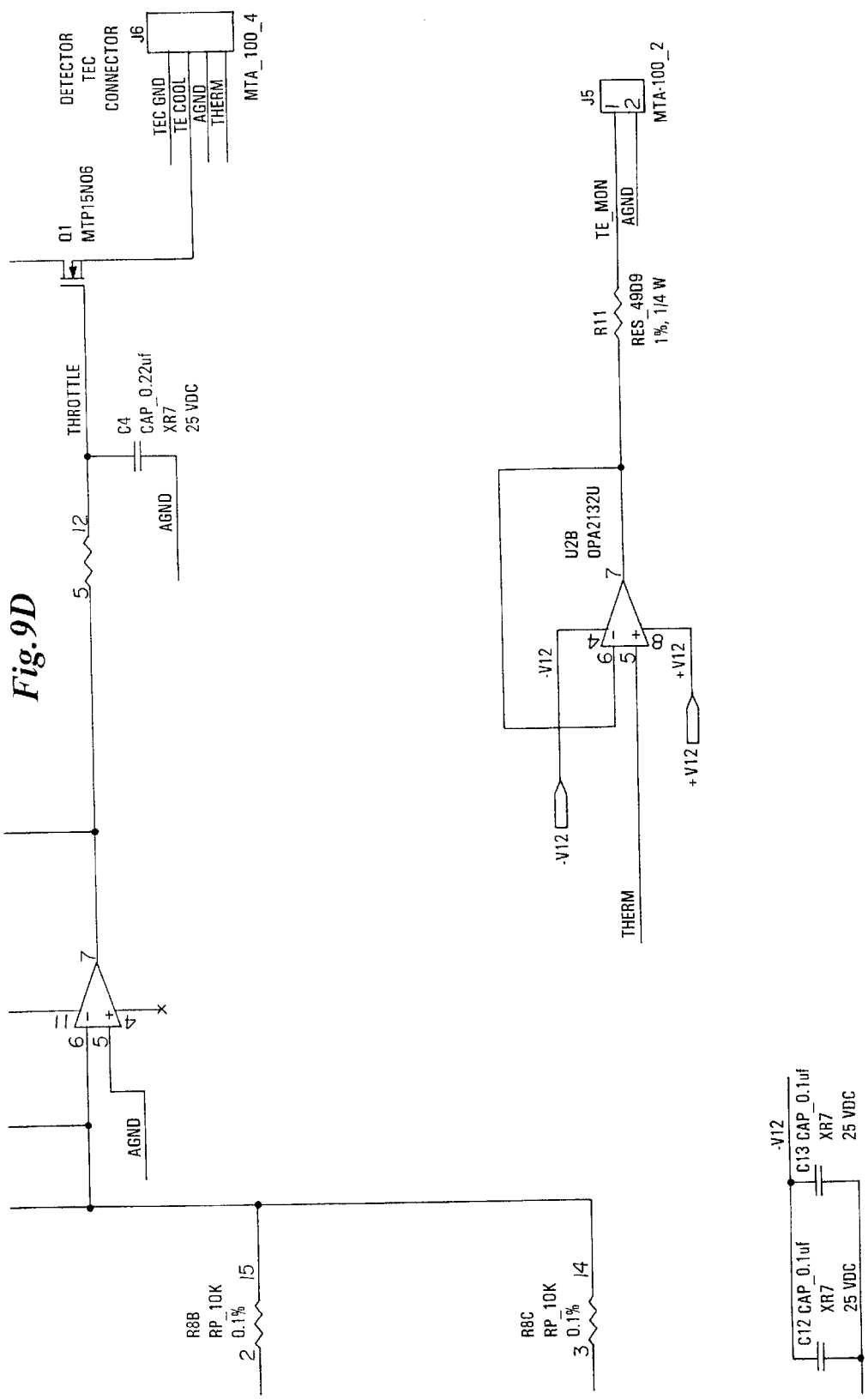
Figure 10:
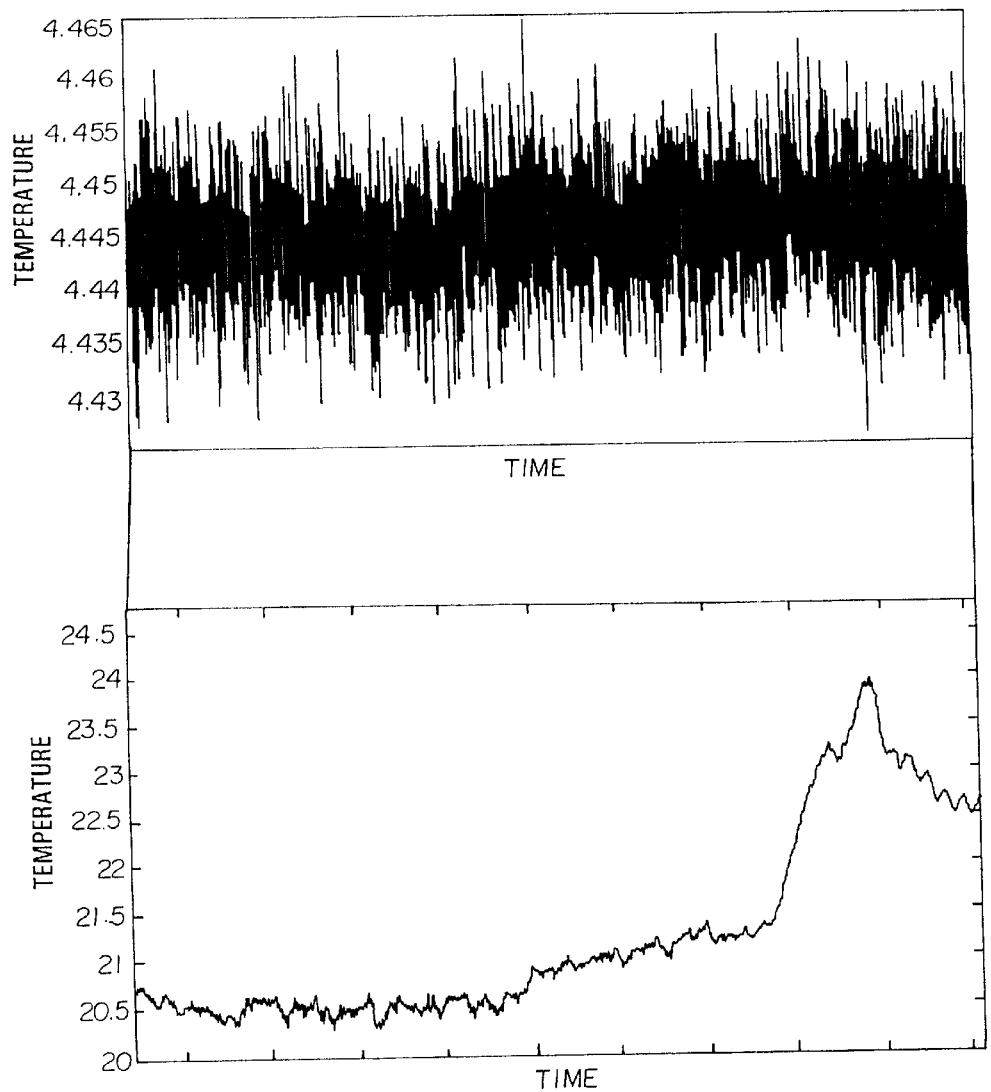
FIG. 10 is a graph depicting cooled VCSEL and ambient temperature over time for the system of FIG. 9B.

There are several different potential embodiments for a cooled VCSEL package which also rely on Thermistor feedback for temperature control. Thermoelectric (TE) cooling is a preferred embodiment for the VCSEL method and device described here. While FIG. 7A shows the generalized block diagram of a temperature control circuit, FIG. 9 shows a specific embodiment of a Thermistor feedback control circuit that provides power regulation to the TE cooler. Essentially its operation is very similar to the heated control circuit shown in FIG. 7B, with the exception that its temperature response is reversed. The circuit's output is zero when the temperature is below the set point temperature and fully on when the VCSEL is well above the set point temperature. FIG. 10 shows the measured Thermistor response over approximately a 10-hour period along with the ambient temperature over the same time period. The total VCSEL temperature variation over the course of the experiment is 0.005° C., which corresponds to a VCSEL lasing wavenumber shift of 0.005 cm$^{-1}$ assuming a typical temperature coefficient value. While the performances of the heated and cooled packages are similar, the TE cooled VCSEL package is a preferred embodiment because it can be implemented with a smaller total package size and potentially lower cost.

In preferred embodiments, the subsystem of the present invention includes shift estimation and correction methodology. The purpose of shift estimation and correction methodology is to detect and remove any long-term VCSEL lasing wavelength drift that might occur during its lifetime. The embodiments involve a spectral reference and an algorithm that uses spectra of the reference, which are separated in time in order to detect wavenumber shifts between them. The spectral wavenumber shifts are then used to calculate the VCSEL wavenumber shift. The spectral reference can be any physical or chemical sample or device that demonstrates a single or multiple stable and resolved spectral features over a wavelength region of interest. In one embodiment, a spectrum of this reference is obtained upon the initial installation of the VCSEL in an instrument. This spectrum is then compared to spectra obtained of the spectral reference during the course of its life. In another embodiment, a spectrum of the spectral reference obtained from one instrument is used to provide a means to detect and correct VCSEL lasing wavelength drifts on additional instruments. In this manner, the VCSELs, and therefore the spectral wavelength axes of all instruments, will be corrected to a standard reference.

Figure 11:
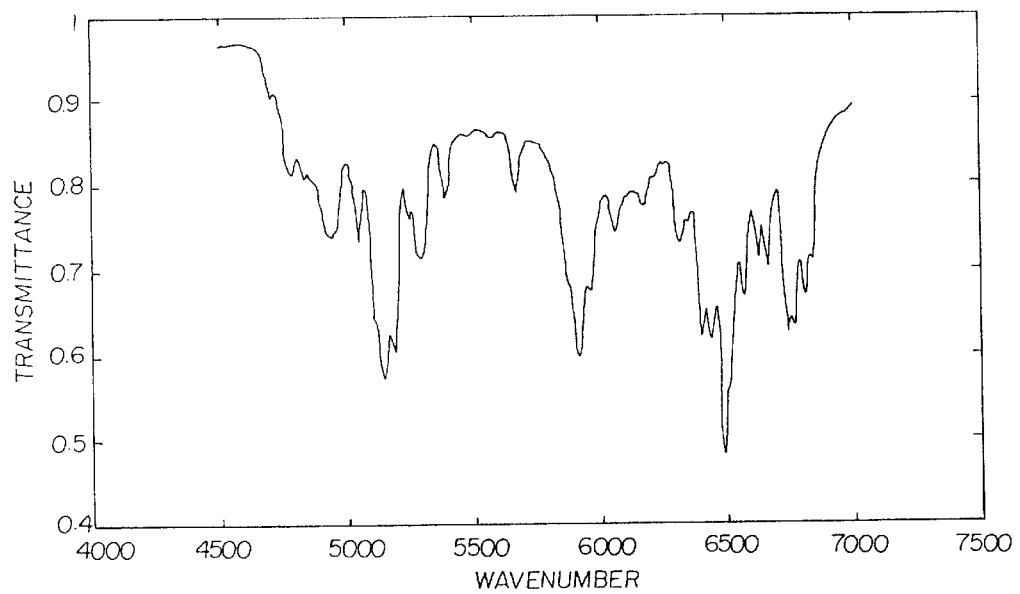
FIG. 11 depicts a spectrum of erbium, dysprosium, and holmium oxides doped into a spectralon reference sample.
Figure 12:
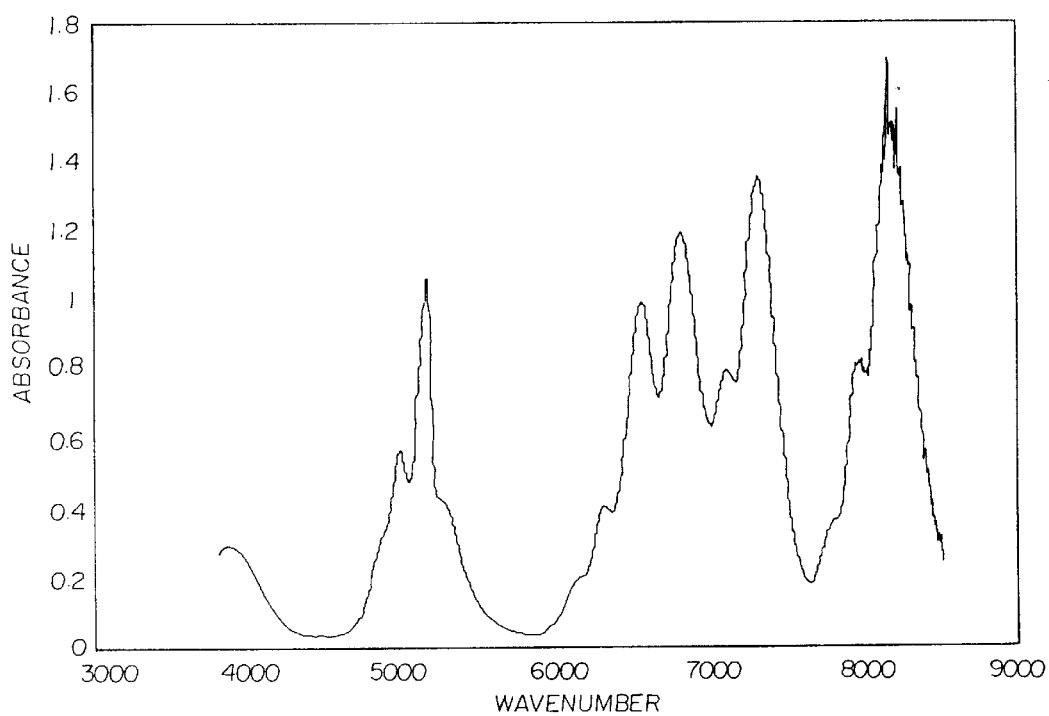
FIG. 12 depicts a samarium and holmium oxide doped into a glass substrate reference sample.

As mentioned above, any chemical sample or mechanical device that exhibits multiple stable and resolved spectral features in the region of interest can be used as a spectral reference or reference sample. The rare-earth series of metal oxides have been found to offer several usable chemical features. Depending upon the wavelength region of interest, different combinations of rare earth metal-oxides can be used to generate a sample that exhibits multiple resolved and stable features. These metal oxides can be subsequently incorporated into a solid, but photometrically transparent, matrix such as spectralon or any other diffusely reflecting material that does not contribute significant spectral features of its own. An example of a spectrum from such a sample is shown in FIG. 11. The material of FIG. 11 is erbium, dysprosium and holmium oxides doped into spectralon. The rare-earth metal oxides can also be incorporated into transmissive materials, such as glass. Careful selection of the glass substrate is required to insure that it will not alter or interfere with the spectral features of the metal oxides. FIG. 12 shows a spectrum obtained from a mixture of samarium and holmium doped into a glass substrate.

Figure 13:
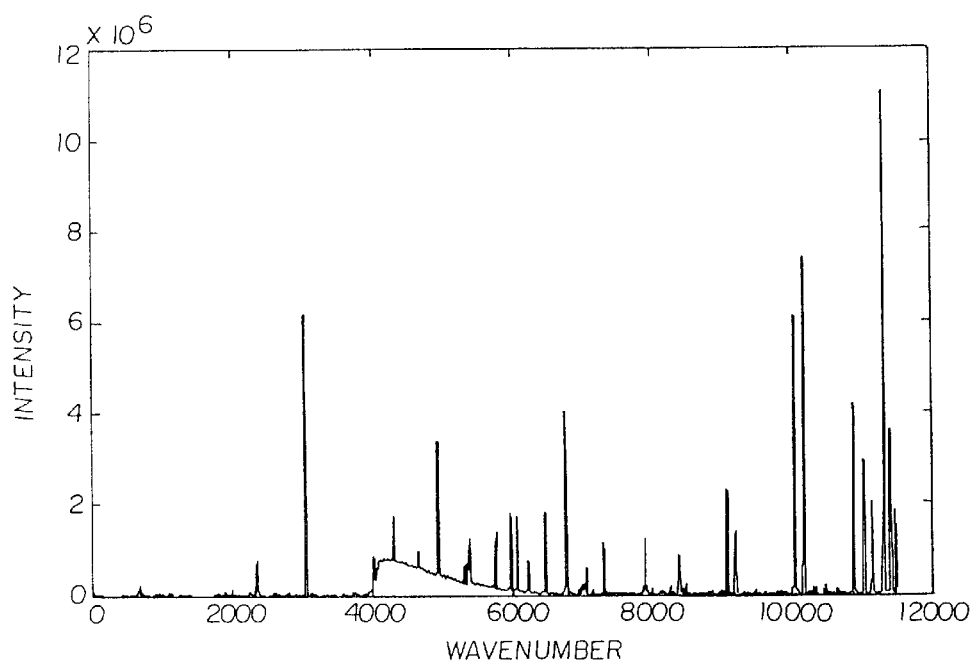
FIG. 13 depicts a spectrum of a xenon emission lamp reference sample.

The noble gasses also exhibit spectral features in the near-infrared region. They are atomic emission transitions that are stimulated by heat excitation of the gas. The resulting spectral features are very sharp, less than a wavenumber in the near-infrared region, and demonstrate no background other than the instrument's own response function. Argon, neon, krypton, and xenon have been found to be suitable rare gas emission lamps. A spectrum of xenon is shown in FIG. 13 as a representative example of the spectra of the noble gases.

Physical devices can also be used to provide a spectral reference. For example, Fabry-Perot cavities can be constructed which result in sharp features that are dependent upon the spacing between the sides of the cavity. Multiple cavities can be used simultaneously or in series to provide several features across any spectral region.

In cases where high precision and accuracy of the reference laser are required, the temperature coefficient of the reference sample or spectral reference must be considered. Spectral features that are dependent upon the structure of the molecule or device will vary both in intensity and wavelength position with temperature. In addition, different features from the same sample may exhibit different temperature coefficients. In order to minimize the effects of sample temperature on VCSEL lasing wavelength shift estimation, the temperature coefficient of each spectral feature is determined, and a subsequent correction is applied.

Figure 14:
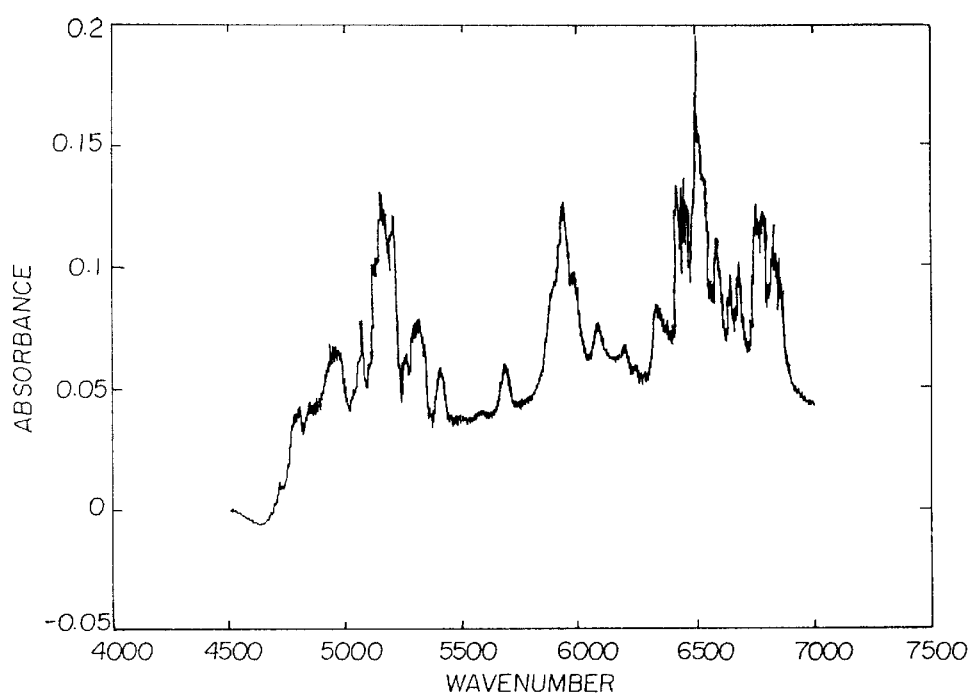
FIG. 14 illustrates spectra of rare-earth doped spectralon obtained over a range of temperatures.
Figure 15:
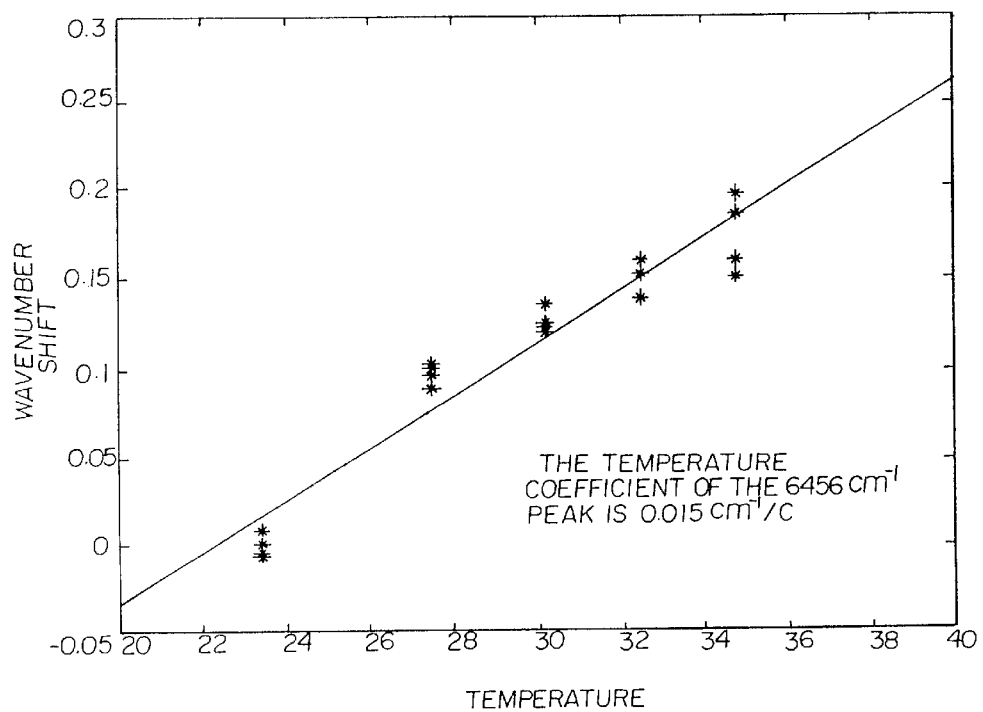
FIG. 15 graphically depicts temperature vs. wavenumber shift for the 6456 cm$^{-1}$ peak.

The temperature coefficient of each spectral feature can be obtained using an interferometer where reference laser drift is negligible. A helium-neon laser fulfills this requirement. Spectra of the chemical or physical sample or device are then obtained over a range of temperatures. Temperature coefficients, which indicate the wavenumber positional sensitivity of a spectral feature to temperature changes, can then be calculated for each feature in the spectra. FIG. 14 shows the spectra obtained of rare-earth doped spectralon over a range of temperatures using a temperature controlled interferometer with a helium-neon reference. FIG. 15 shows the temperature versus wavenumber shift for the 6456 cm$^{-1}$ spectral feature. Table 1 below shows the temperature coefficients for several features of the spectra in FIG. 14 that were calculated from plots similar to FIG. 15.

TABLE 1

| Peak Location (cm$^{-1}$) | Temperature Coefficient (cm$^{-1}$/C.) |
|---|---|
| 4854 | −0.010 |
| 4943 | 0.015 |
| 5071 | −0.004 |
| 5158 | −0.007 |
| 5686 | 0.000 |
| 6083 | −0.003 |
| 6425 | 0.014 |
| 6456 | 0.015 |
| 6469 | 0.000 |
| 6508 | −0.005 |
| 6529 | −0.021 |
| 6567 | −0.041 |
| 6590 | −0.040 |
| 6646 | −0.012 |
| 6683 | −0.033 |
| 6836 | −0.053 |
| 6861 | −0.058 |

The present invention preferably includes or functions with an embedded computer system or other electronic means that includes an algorithm to provide shift estimation and correction. The purpose of the algorithm is to accurately measure any wavelength position change of one or multiple features in a spectral reference. This is accomplished through comparison of two spectra of the same spectral reference that are taken at different times. The concept is to compare a spectrum of the reference sample obtained upon initial instrument assembly and calibration, or later recalibration, to future spectra of the same sample throughout the instrument's life. The positional change of features between the original and future spectra is used to calculate the drift in the reference laser's true lasing wavenumber. Subsequent spectra of any sample type are then corrected to the instrument's original reference laser wavenumber by accounting for the estimated laser shift.

The shift estimation is accurate provided the peak locations of the spectral features are accurately measured. There are several methods for determining the wavenumber location of the peak of a spectral feature. The maximum value around the feature, center of gravity, and up-interpolation followed by maximum value determination are a few methods that can be used to estimate the wavelength location of the peak of a spectral feature, as is known in the art.

A preferred embodiment of peak location estimation for this invention, however, involves up-interpolation of the spectrum and subsequent calculation of its first derivative. The spectral peak maxima correspond to zero crossings in its first derivative. In addition, the regions near zero crossings can be accurately represented by lines. Consequently, the wavenumber location of the zero crossings, and therefore the spectral peaks, can be calculated using a linear interpolation between the two points that bound the zero crossing. Each pair of points is used to calculate a slope of the line they form. The zero crossing is then calculated from each slope and one of the points.

In order to improve laser drift estimation accuracy, it is desirable, but not required, to include multiple spectra features in the shift estimation calculation. This is because spectral signal to noise and changes in environmental conditions contribute uncertainty to the estimation of the true peak location of each feature. Inclusion of multiple features will help to reduce the uncertainty through a regression mechanism.

The laser shift estimation accuracy is defined by combination of the number of reference spectral features, their signal to noise, and their temperature coefficients. In cases where the signal to noise of the reference features is low or the effects of the reference feature's temperature coefficients cannot be sufficiently corrected, additional reference features may be required. Consequently, there is no set minimum number of features, minimum temperature coefficients, or signal to noise. The selection of the values for these parameters is ultimately dependent upon the wavenumber shift sensitivity of the specific spectroscopic application under investigation.

Figure 16:
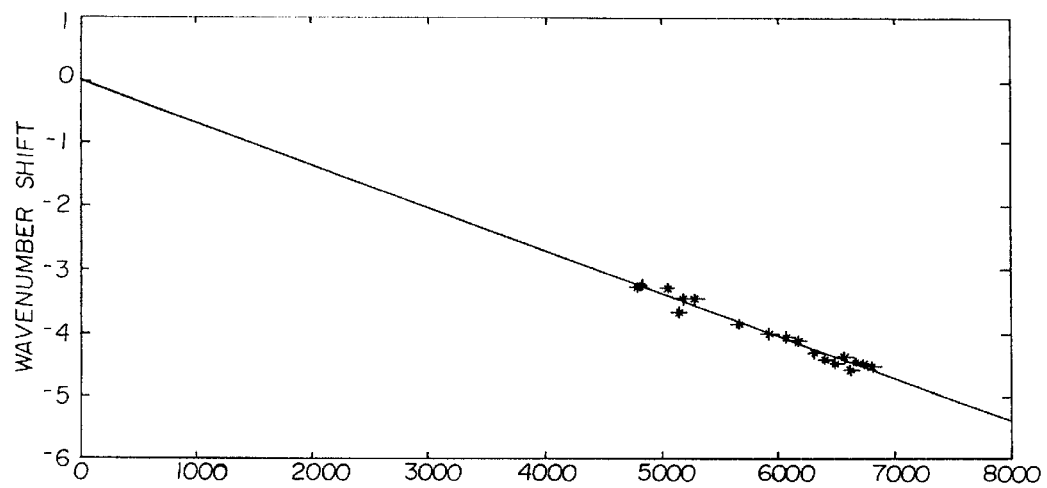
FIG. 16 graphically depicts an example of beta regression.

Equation 2 shows that a shift in the reference laser's emission wavenumber will affect larger spectral wavenumbers more than smaller spectral wavenumbers. This relationship is linear, such that the spectral shift at 8000 cm$^{-1}$ will be twice that of 4000 cm$^{-1}$. Consequently, once the peak locations of the spectral reference's features for both the original and comparison spectra are determined, a linear regression of the spectral feature shifts and Equation 4 are used to determine the reference laser's shift.

$$\Delta v = \beta v_o \tag{4}$$

Where $\Delta v$ is the reference laser's shift, $\beta$ is the slope of the linear regression, and $v_o$ is the known lasing wavenumber from the original instrument calibration. FIG. 16 graphically depicts an example of the linear regression used to calculate $\beta$. At zero wavenumbers, the shift must be zero. This is a known point in the regression.

In some applications, the effects of a reference laser wavenumber shift on spectral resolution are not a concern. In such applications, Equation 2 can be used to generate a new spectral wavenumber axis, which corresponds to the current instrumental conditions, that is applied to future spectra of any sample type. While the spectra will be accurate in terms of the wavenumber axis, the discrete data points will not correspond to the wavenumber locations of the original calibration spectra. In order to allow the shift-corrected spectra to be directly comparable to the original spectra and allow predictions of chemical information from the original calibration model, a final spectral interpolation must be used to find the spectral values that correspond to the wavenumber positions of the discrete data points in the original calibration spectra. Cubic, spline, or other shape-sensitive interpolation methods are acceptable embodiments for this final step.

In applications where shifts in both the wavenumber axis and spectral resolution are of concern, the spectral interferograms themselves can be corrected. In this type of correction, the VCSEL shift estimate is used to determine the zero crossing separation in the spectral interferogram. The zero path difference location is determined and used with the zero crossing separation to calculate the mirror position for each point in the spectral interferogram. Using this information, the interferogram intensity values at the mirror positions corresponding to the original calibration can be interpolated. Cubic, spline, or other shape-sensitive interpolation methods are acceptable embodiments for this final step.

A preferred embodiment of the complete VCSEL method and device or subsystem of the present invention includes a single mode 850 nm VCSEL, a precision current supply with short term stability better than 0.05 $\mu A/°$ C., a TE cooled package with temperature stability of better than 0.005° C., the derivative/regression based shift estimation and correction method, and a rare-earth doped spectral reference which can be either diffusely reflecting or transmissive in nature. In order to evaluate the invention's performance, a complete VCSEL method and device was assembled using the components and methods outlined above. An exception is that the precision current supply was designed to provide a tunable output. Using this tunable current supply, known and stable VCSEL lasing wavenumber shifts were induced that resulted in corresponding spectral shifts. The known lasing wavenumber changes allowed the direct evaluation of the performance of the entire VCSEL package.

A set of solutions containing glucose, ethanol, urea, water, creatinine, and polystyrene scattering beads was generated in order to perform the evaluation of the VCSEL method and device. Using the above-described VCSEL package, spectra of the solutions and rare-earth doped spectralon were obtained and a Partial Least Squares (PLS) calibration model for glucose was generated. These initial spectra and model were obtained with a stable VCSEL current, and therefore contained no induced VCSEL wavenumber shifts. This represents the control case for baseline prediction performance and spectral variation analysis using principle components analysis (PCA).

Spectra of the same solutions were then obtained in the presence of induced VCSEL wavenumber shifts. Each time the current supplied to the VCSEL was changed; a spectrum of spectralon doped with rare-earth oxides was taken. These spectra were then used in conjunction with doped spectralon spectra obtained in the first calibration to estimate shifts and determine the appropriate corrections. Again, PCA was used to evaluate spectral variation, and a PLS glucose calibration model was used to determine the effects of the VCSEL wavenumber shifts on glucose concentration predictions. Finally, a set of validation solutions of similar, but different, composition was generated and their spectra were obtained in the presence of VCSEL shifts. The two models were used to predict the new spectra in order to determine the effects of shifts in true validation.

Finally, the spectra used in the second calibration were corrected using the described VCSEL shift estimation and correction methodology, and a third PLS calibration was generated. In addition, the validation spectra were also corrected and predicted using the three models. Table 2 below shows a summary of the PLS cross-validated standard errors of prediction (CVSEP) for the three calibrations models and the true validation SEP for several model-validation set combinations. Examination of Table 2 shows the CVSEP for the stable calibration is 4.39 mg/dl, which represents the benchmark for the correction methodology. The CVSEP of the varied current calibration is poorer due to the additional spectral complexity resulting from the wavenumber shifts. The CVSEP of the corrected spectra is almost identical to the stable calibration. In true validation, the predictions are poor when uncorrected spectra are involved either in calibration or validation. The SEP of the corrected validation being predicted by the stable calibration model is 5.3 mg/dl, which compares very well to the CVSEP of 4.39 mg/dl for the stable calibration. The uncorrected validation spectra predict very poorly with the stable calibration whose corresponding SEP is 408.3 mg/dl. The prediction results for the corrected spectra clearly demonstrate the effectiveness of the VCSEL method and device for removing the effects of reference laser shifts.

TABLE 2

| Calibration/Validation | SEP (mg/dl) |
| --- | --- |
| Current Stable Calibration/Cross Validation | 4.39 |
| Varied Current Calibration/Cross Validation | 5.07 |
| Shift Corrected Varied Current Calibration/Cross Validation | 4.43 |
| Current Stable Calibration/Uncorrected Validation | 408.3 |
| Current Stable Calibration/Corrected Validation | 5.3 |
| Varied Current Calibration/Uncorrected Validation | 17.5 |
| Varied Current Calibration/Corrected Validation | 6.5 |

Figure 17A:
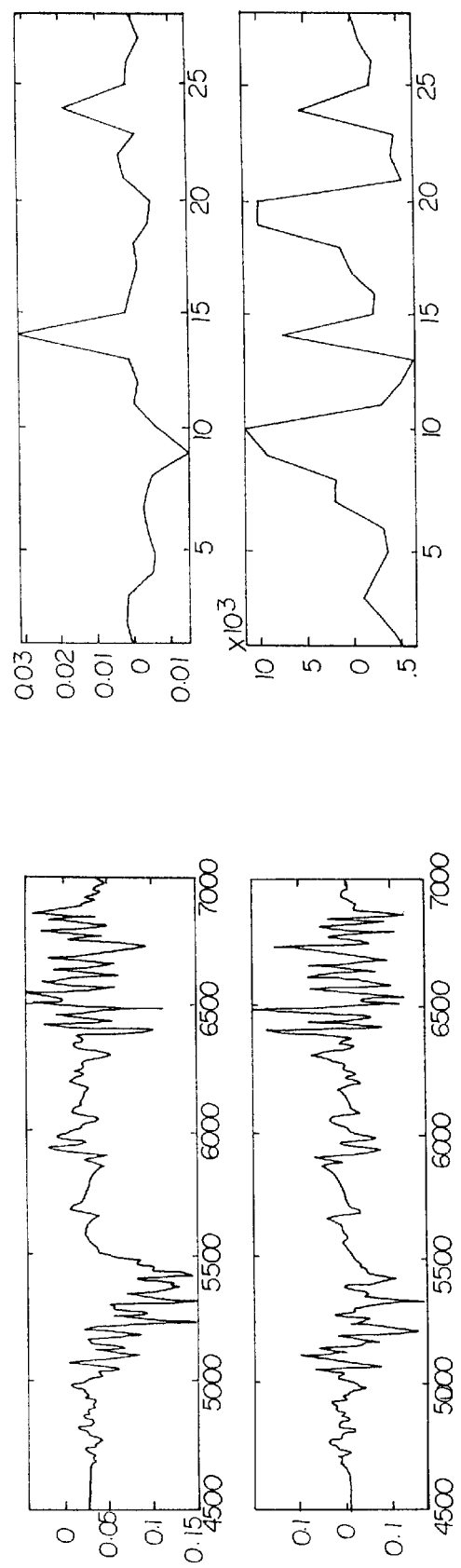
FIGS. 17A and 17B graphically depict experimental results from a PCA analysis demonstrating the effectiveness of correction methodology.
Figure 17B:
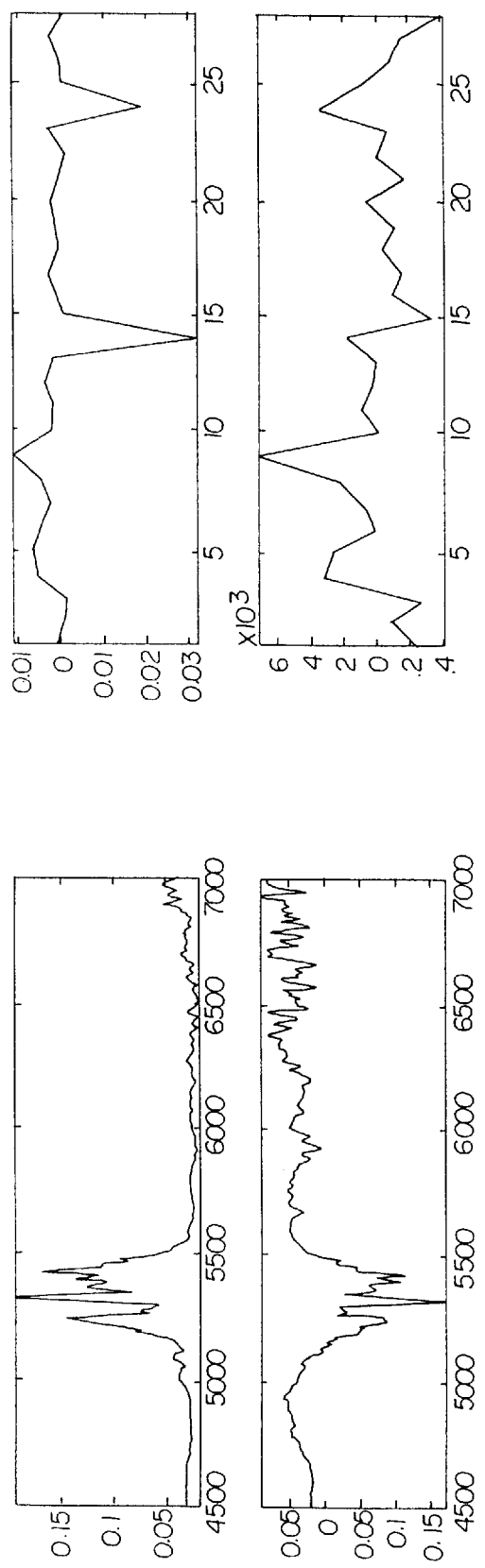

FIG. 17A shows the first two PCA eigenvectors and scores for the rare earth doped spectralon spectra obtained during the second calibration before correction. FIG. 17B shows the same data after correction. Notice that the derivative-shaped eigenvectors, which indicate the presence of wavenumber shifts, are gone for the corrected spectra in FIG. 17B. The eigenvectors of the corrected spectra primarily exhibit water vapor variance due to changes in ambient humidity. The combination of the PCA and PLS results show that the VCSEL method and device of the present invention results in a laser reference that exhibit qualitative and quantitative performance that is substantially similar to a helium neon laser reference. Therefore, the invention represents a viable substitute or replacement for the HeNe laser while simultaneously offering significant commercial advantages.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

We claim:

1. A subassembly for use in optical spectroscopy comprising:

an interferometer including optical components for receiving light and passing the light along a defined light path, the optical components including a beam-splitter separating the light into two portions and means for introducing a path length difference between the portions;

a vertical cavity surface emitting laser, including electronics to drive the vertical cavity surface emitting laser to project a beam therefrom, operatively mounted on the interferometer with the beam generally following the defined light path to act as a reference laser for the interferometer, to a photodetector, the vertical cavity surface emitting laser including means for temperature control and means for current control connected thereto and computing means including an algorithm for correcting wavenumber drift by the vertical cavity surface emitting laser.

2. The subassembly of claim 1, wherein the algorithm for correcting wavenumber drift by the vertical cavity surface emitting laser includes factors derived from spectroscopic analysis of a reference sample utilizing the interferometer and vertical cavity surface emitting laser and comparing at least a portion of the generated spectrum to a known spectrum for the reference sample.

3. The subassembly of claim 2, wherein the algorithm employs the relative difference between at least a portion of the generated spectrum and the known spectrum of the reference sample.

4. The subassembly of claim 1, wherein the algorithm for correcting wavenumber drift by the vertical cavity surface emitting laser includes factors derived from multiple spectroscopic analysis of a reference sample utilizing a second interferometer and a second vertical cavity surface emitting laser of the same type and comparing at least a portion of each of the generated spectrum to a know spectrum for the reference sample.

5. The subassembly of claim 1, wherein the interferometer is a Fourier transform type interferometer.

6. The subassembly of claim 2, wherein the reference sample includes at least one rare-earth oxide.

7. The subassembly of claim 6, wherein the at least one rare-earth oxide is doped into a diffusely reflective substrate.

8. The subassembly of claim 6, wherein the at least one rare-earth oxide is doped into a transmissive substrate.

9. The subassembly of claim 6, wherein the at least one rare-earth oxide is selected from the group consisting of: erbium oxide, dysprosium oxide, holmium oxide or samarium oxide.

10. The subassembly of claim 2, wherein the reference sample is a rare gas emission lamp selected from the group consisting of: a neon emission lamp, a krypton emission lamp, an argon emission lamp or a xenon emission lamp.

11. The subassembly of claim 2, wherein the reference sample is one or more etalons that may be measured simultaneously or in series.

12. The subassembly of claim 1, wherein the subassembly is mounted in a spectrometer system including a sample holder and the reference sample is measured while positioned in the sample holder.

13. In an optical spectrometry system including an interferometer which introduces an optical pathlength difference to portions of a beam along defined optical paths, the interferometer including means for mounting a reference laser so that a beam generated by the reference laser is received generally along the same defined optical paths and received by a photodetector to elucidate path length differences and provide an internal wavenumber axis standard for measurements on the optical spectrometry system, the improvement comprising:

a vertical cavity surface emitting laser disposed on the means for mounting a reference laser, the vertical cavity surface emitting laser including means for temperature control and means for current control connected thereto and computing means including an algorithm for correcting wavenumber drift by the vertical cavity surface emitting laser.

14. The optical spectrometry system of claim 13, wherein the algorithm for correcting wavenumber drift by the vertical cavity surface emitting laser includes factors derived from spectroscopic analysis of a reference sample utilizing the interferometer and vertical cavity surface emitting laser and comparing at least a portion of the generated spectrum to a known spectrum for the reference sample.

15. The optical spectrometry system of claim 14, wherein the algorithm employs the relative difference between at least a portion of the generated spectrum and the known spectrum of the reference sample.

16. The optical spectrometry system of claim 13, wherein the algorithm for correcting wavenumber drift by the vertical cavity surface emitting laser includes factors derived from multiple spectroscopic analysis of a reference sample utilizing a second interferometer and a second vertical cavity surface emitting laser of the same type and comparing at least a portion of each of the generated spectrum to a know spectrum for the reference sample.

17. The optical spectrometry system of claim 13, wherein the interferometer is a Fourier transform type interferometer.

18. The optical spectrometry system of claim 14, wherein the reference sample includes at least one rare-earth oxide.

19. The optical spectrometry system of claim 18, wherein the at least one rare-earth oxide is doped into a diffusely reflective substrate.

20. The optical spectrometry system of claim 18, wherein the at least one rare-earth oxide is doped into a transmissive substrate.

21. The optical spectrometry system of claim 18, wherein the at least one rare-earth oxide is selected from the group consisting of: erbium oxide, dysprosium oxide, holmium oxide or samarium oxide.

22. The optical spectrometry system of claim 14, wherein the reference sample is a rare gas emission lamp selected from the group consisting of: a neon emission lamp, a krypton emission lamp, an argon emission lamp or a xenon emission lamp.

23. The optical spectrometry system of claim 14, wherein the reference sample is one or more etalons that may be measured simultaneously or in series.

24. The optical spectrometry system of claim 13, further comprising a sample holder, wherein the reference sample is measured while positioned in the sample holder.

25. A method for correction of a vertical cavity surface emitting laser used as a reference laser in an optical spectrometry system, the method comprising the steps of:

providing an interferometer including optical components for receiving light and passing the light along a defined light path and providing a vertical cavity surface emitting laser projecting a beam therefrom operatively mounted on the interferometer with the beam generally following the defined light path to act as a reference laser for the interferometer; and correcting the wavenumber drift by the vertical cavity surface emitting laser by providing computing means including an algorithm derived from spectrometric analysis of a reference utilizing the vertical cavity surface emitting laser as a reference laser and comparing at least a portion of the spectrum generated to at least a portion of a known spectrum for the reference sample.

26. The method of claim 25, wherein the algorithm for correcting wavenumber drift by the vertical cavity surface emitting laser is derived by spectroscopic analysis of a reference sample utilizing the interferometer and vertical cavity surface emitting laser and comparing at least a portion of the generated spectrum to a known spectrum for the reference sample.

27. The method of claim 26, wherein the algorithm employs the relative difference between at least a portion of the generated spectrum and the known spectrum of the reference sample.

28. The method of claim 26, wherein the algorithm employs a derivative based determination of wavenumber locations of spectral features.

29. The method of claim 26, wherein the algorithm employs a center of gravity based determination of wavenumber location of spectral features.

30. The method of claim 26, wherein the algorithm employs an interpolation based determination of wavenumber location of spectral properties.

31. The method of claim 26, wherein the algorithm employs a wavenumber shift versus wavenumber regression to determine the shift correction.

32. The method of claim 25, wherein the algorithm for correcting wavenumber drift by the vertical cavity surface emitting laser is derived from multiple spectroscopic analysis of a reference sample utilizing a second interferometer and a second vertical cavity surface emitting laser of the same type and comparing at least a portion of each of the generated spectrum to a know spectrum for the reference sample.

* * * * *